(12) United States Patent
Meeker et al.

(10) Patent No.: US 9,283,808 B2
(45) Date of Patent: *Mar. 15, 2016

(54) WHEEL BEARING ASSEMBLY

(71) Applicant: Kyklos Bearing International, LLC, Sandusky, OH (US)

(72) Inventors: Steven E. Meeker, Norwalk, OH (US); David N. Johnson, Bay Village, OH (US); Kelly S. Hinds, Sandusky, OH (US); Connie J. Buynacek, Sandusky, OH (US); Martin P. Grover, Oak Harbor, OH (US)

(73) Assignee: Kyklos Bearing International, LLC, Sandusky, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/495,077

(22) Filed: Sep. 24, 2014

(65) Prior Publication Data

US 2015/0010260 A1 Jan. 8, 2015

Related U.S. Application Data

(63) Continuation-in-part of application No. 12/291,144, filed on Nov. 6, 2008, now Pat. No. 8,845,203.

(51) Int. Cl.
| | |
|---|---|
| *F16C 13/00* | (2006.01) |
| *B60B 27/00* | (2006.01) |
| *F16C 19/50* | (2006.01) |

(Continued)

(52) U.S. Cl.
CPC ........... *B60B 27/0005* (2013.01); *B60B 27/001* (2013.01); *B60B 27/0084* (2013.01); *F16C 19/505* (2013.01); *F16C 19/522* (2013.01); *F16C 33/586* (2013.01); *F16C 39/02* (2013.01); *B60B 2380/774* (2013.01); *F16C 19/184* (2013.01); *F16C 19/386* (2013.01); *F16C 19/497* (2013.01); *F16C 21/00* (2013.01); *F16C 2326/02* (2013.01)

(58) Field of Classification Search
CPC .. F16C 19/183–19/187; F16C 19/385–19/386; F16C 19/522; F16C 19/527; F16C 2326/02; B60B 27/005; B60B 27/001; B60B 27/0015; B60B 2380/12; B60B 2380/14
See application file for complete search history.

(56) References Cited

U.S. PATENT DOCUMENTS 8,104,970 B2 * 1/2012 Komori .................. 384/480

FOREIGN PATENT DOCUMENTS

| DE | 4017764 | 5/1991 |
|---|---|---|
| DE | 102008049041 | * 4/2010 |
| JP | 2007271055 | * 10/2007 |

*Primary Examiner* — James Pilkington
(74) *Attorney, Agent, or Firm* — Hinshaw & Culbertson LLP

(57) ABSTRACT

A passenger automotive vehicle wheel bearing assembly having improved impact Brinell resistance is provided. Due to a controlled gap between a rotating component and a non-rotating component or a vehicle suspension structure, the non-rotating component or the vehicle suspension structure is permitted to share impact loads caused by a sufficient radial or side impact (such as a pothole or curb impact) to the rotating component, thus preventing excessive loads from being transmitted to rolling elements, and providing greater resistance against Brinell impact damage that would generate a noise and/or vibration condition in the bearing assembly. Wheel bearing assemblies according to the invention provide increased impact Brinell resistance while avoiding excessive contact between the rotating component and the non-rotating component or the vehicle suspension structure during extreme cornering maneuvers.

21 Claims, 17 Drawing Sheets

(51) Int. Cl.
*F16C 33/58* (2006.01)
*F16C 39/02* (2006.01)
*F16C 19/52* (2006.01)
*F16C 19/18* (2006.01)
*F16C 19/38* (2006.01)
*F16C 19/49* (2006.01)
*F16C 21/00* (2006.01)

WHEEL BEARING ASSEMBLY

CROSS-REFERENCE TO RELATED APPLICATION

This application is a continuation-in-part of U.S. patent application Ser. No. 12/291,144, filed Nov. 6, 2008, the entire specification of which is incorporated by reference.

FIELD OF THE INVENTION

The present invention relates to wheel bearing assemblies. More particularly, it relates to a wheel bearing assembly having improved side-impact and radial-impact Brinell resistance.

BACKGROUND OF THE INVENTION

As combinations of larger diameter wheels, lower profile tires and more rigid or sensitive corner suspension components are being employed in newer vehicle platforms, the vehicle wheel rotating bearing assembly is much more susceptible to receiving "Brinell marks" or "brinelling" due to low-speed side impacts with objects such as curbs, such as a 3-mph curb-impact, and radial impacts with objects such as potholes, with high-strength wheels and low-profile tires. Brinell marks are microscopic indents in the bearing raceway that occur as a result of impact force loads transmitted from a bearing mating attachment component through the bearing rolling elements. For example, a wheel mounting flange may sustain an impact force and transmit the force load to ball components which impact the bearing raceways of a ball bearing assembly. The typical result of a radial or side-impact Brinell event is the development of a noisy or vibrating bearing assembly in the vehicle.

A typical vehicle curb impact event produces a sudden high peak offset load to the centerline of the wheel bearing assembly. During this type of load the side forces quickly reduce the preload condition of the bearing rolling elements. The axial movement of the rotating component inward toward the non-rotating component then forces some of the balls to move outward radially as they are forced to move inboard along the arcuate profile of the inner ballraces. At the same time, because the load is offset (generated by a curb-height strike to the vehicle, which is typically offset from the wheel mounting axis by about 150-200 millimeters, there is also a resultant downward transverse force to the rotating component that causes the largest ballrace impact Brinell depths in the top region of the inboard ballrows and the bottom region of the outboard ballrows, thus generating the noise and/or vibration condition in these regions at the lowest impact state.

Similarly, a pothole radial impact event can produce quick forces to damage the bearing raceways, but this contact places the largest impact Brinell depths in the bottom region of the ballrows, as the impact forces are radial. Thus, in order to prevent low speed ballrace damage from both types of events (radial or axial), a combination of features or accompanying "contact" surfaces is required.

A common design solution is to increase the diametral or axial size of the bearing and/or the size or number of rolling elements of the bearing, which usually results in mass/weight and cost penalties and renders the bearing design inefficient in terms of straight running and cornering capabilities. Bearing raceway shoulder heights may also be increased with respect to the ball diameter to provide additional raceway support for the ball during an extreme side force event. This approach, however, raises processing costs. The penalty with all of the traditional ideas is the addition of mass/weight, rotational torque, and costs of the bearing and mating corner components to the bearing.

A need therefore exists for a bearing assembly having improved radial- and side-impact Brinell resistance without significant additional mass or reduced efficiency compared to existing bearing assemblies.

BRIEF SUMMARY OF THE INVENTION

In one aspect of the present invention, a bearing assembly is provided comprising a rotating component defining an axis, a non-rotating component fixed with respect to a vehicle suspension structure (e.g., a knuckle or axle), and bearing elements rotatably coupling the rotating component to the non-rotating component to allow the wheel mounting component to rotate relative to the non-rotating component about the axis. The bearing elements include an outer ring and an inner ring defining a first bearing raceway, the first bearing raceway rollably retaining a plurality of rolling elements. To permit load sharing by the vehicle suspension structure in the event of a side or radial impact, either directly or via the non-rotating component, an annular portion of the wheel mounting component is spaced from a non-rotating annular surface of either the non-rotating component or the vehicle suspension structure, both radially and axially in an outboard direction by radial and axial clearances, so that a sufficient side or radial impact to the wheel mounting component will cause the wheel mounting component to move into contact with the non-rotating annular surface and transmit a part of a resulting impact load to the vehicle suspension structure. In this way, the rolling elements are spared at least a part of the resulting impact load. To increase loads sustainable by the bearing assembly without causing a noisy or vibrating operating condition, the assembly is configured so that at least substantially any radial or side impact loads that would otherwise be sufficient to Brinell damage the first bearing raceway and generate a noise or vibration condition will first cause the wheel mounting component to contact and transmit part of the load to the vehicle suspension structure through the non-rotating annular surface, thus relieving the ballraces of the diverted portion of the load.

In typical motor vehicle applications, the clearance separating the wheel mounting component from the non-rotating annular surface is preferably at least about 0.04 millimeters in each of the radial and axial directions, at most about 0.30 millimeters in the axial direction, and at most about 0.15 millimeters in the radial direction. The annular portion of the wheel mounting component is preferably configured to contact the non-rotating annular surface at a contact area having a contact patch width of from about 2 millimeters to about 5 millimeters in both the radial and axial directions. These dimensional requirements are not absolute, but reflect approximate ranges of values found to be effective by the inventors having a footprint of equivalent breadth for purposes of diverting a sufficient amount of load from the ballraces, while at the same time minimizing friction from any incidental contact during extreme maneuvering, such as high-g cornering with respect to the axially-spaced contact region or regions, and high-g braking or acceleration with respect to the radially-spaced contact region or regions. When the rolling elements are balls, the first bearing raceways preferably have shoulder heights of between about 30% to about 50% of the diameters of their respective balls.

In one embodiment, the first bearing raceway is an outboard raceway, the plurality of rolling elements retained in the outboard bearing raceway are outboard rolling elements, and the outer ring and inner ring further define an inboard bearing raceway displaced from the outboard raceway in the inboard direction, the inboard raceway rollably retaining a plurality of inboard rolling elements. As is the case for the first bearing raceway, the assembly is configured so that an impact that could generate noise in the second bearing raceway will first impart some of a resulting impact load from the wheel mounting component to the vehicle suspension structure through the non-rotating annular surface.

Several embodiments are possible by varying the relationships of the basic bearing assembly components. For example, the outer ring may be fixed with respect to the suspension structure and the inner ring fixed with respect to the wheel mounting component. Alternatively, the outer ring may be fixed with respect to the wheel mounting component and the inner ring fixed with respect to the suspension structure.

Various rolling elements may be used advantageously in bearing assemblies according to the present invention, permitting still other embodiments. For example, the rolling elements may be balls or tapered rollers, or in the case of a bearing assembly with multiple raceways, balls may be used in one raceway and tapered rollers in another. Any other suitable rolling elements are also within the scope of the present invention, used alone or in combination with one or more other types of rolling elements. Representative effective dimensions and dimensional ranges discussed herein generally pertain to wheel bearing assemblies in which the rolling elements are balls, and do not necessarily reflect effective ranges for assemblies in which other rolling elements are employed.

In certain embodiments, angular span of the impact Brinell-relieving surfaces may vary. In the embodiments illustrated in the figures, this span is a full 360°, but in other embodiments it may comprise one or more angular ranges at which no supporting contact is provided. Thus, for example, the non-rotating component may comprise a single contact surface or a series of segmented surfaces, comprised of surfaces of one or more non-rotating members.

According to another embodiment, cavity lubrication for corrosion protection purposes may be provided. For example, grease or other suitable lubricant may be provided on or near any of the impact relieving contact surfaces associated with the various controlled gap clearances disclosed herein.

In another aspect of the present invention, a bearing assembly includes a rotating component, a non-rotating component, and ball bearing elements, an annular portion of the wheel mounting component being spaced axially in an outboard direction and radially from a non-rotating annular surface of either the non-rotating component or the vehicle suspension structure by a clearance as in the first aspect. Typically, axial displacement of a wheel mounting component during a side impact causes some of the ball components to roll up on the bearing raceways towards the shoulders of the bearing raceways, which can result in stress concentrations that deepen Brinell indents high in the ball raceway. Advantageously, wheel bearing assemblies according to the invention may limit this shifting of ball components by providing a small axial clearance to limit the axial travel of the wheel mounting component in a side impact event. Preferably, displacement of the ball components along the operating profile of the raceways is limited so that the point of contact between the ball components and the bearing raceways is kept within a range of heights on the raceways of from about 0% to about 35% of the ball diameter. A "point of contact" refers to a generally central point in the contact area between the ball components and the raceways, corresponding to a generally central point in a Brinell indent when a Brinell indent is created. The foregoing advantage of the invention relates primarily to side-impact events, as opposed to during radial/pothole impact events where the ball components tend to remain low on the ball raceways rather than shifting up the raceway shoulders.

DETAILED DESCRIPTION OF THE INVENTION

Figure 1:
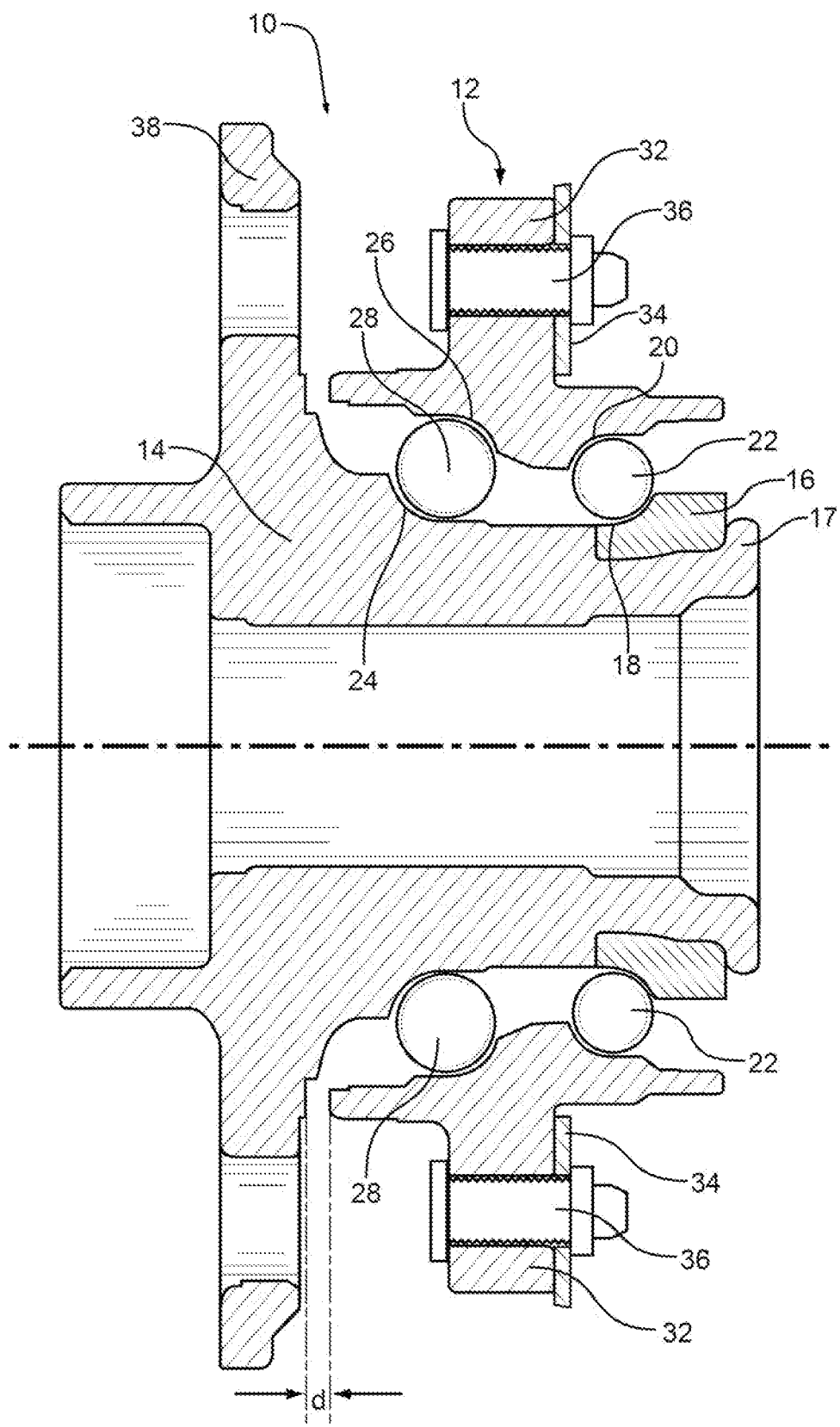
FIG. 1 is a basic illustration of a bearing assembly in side sectional view.
Figure 2:
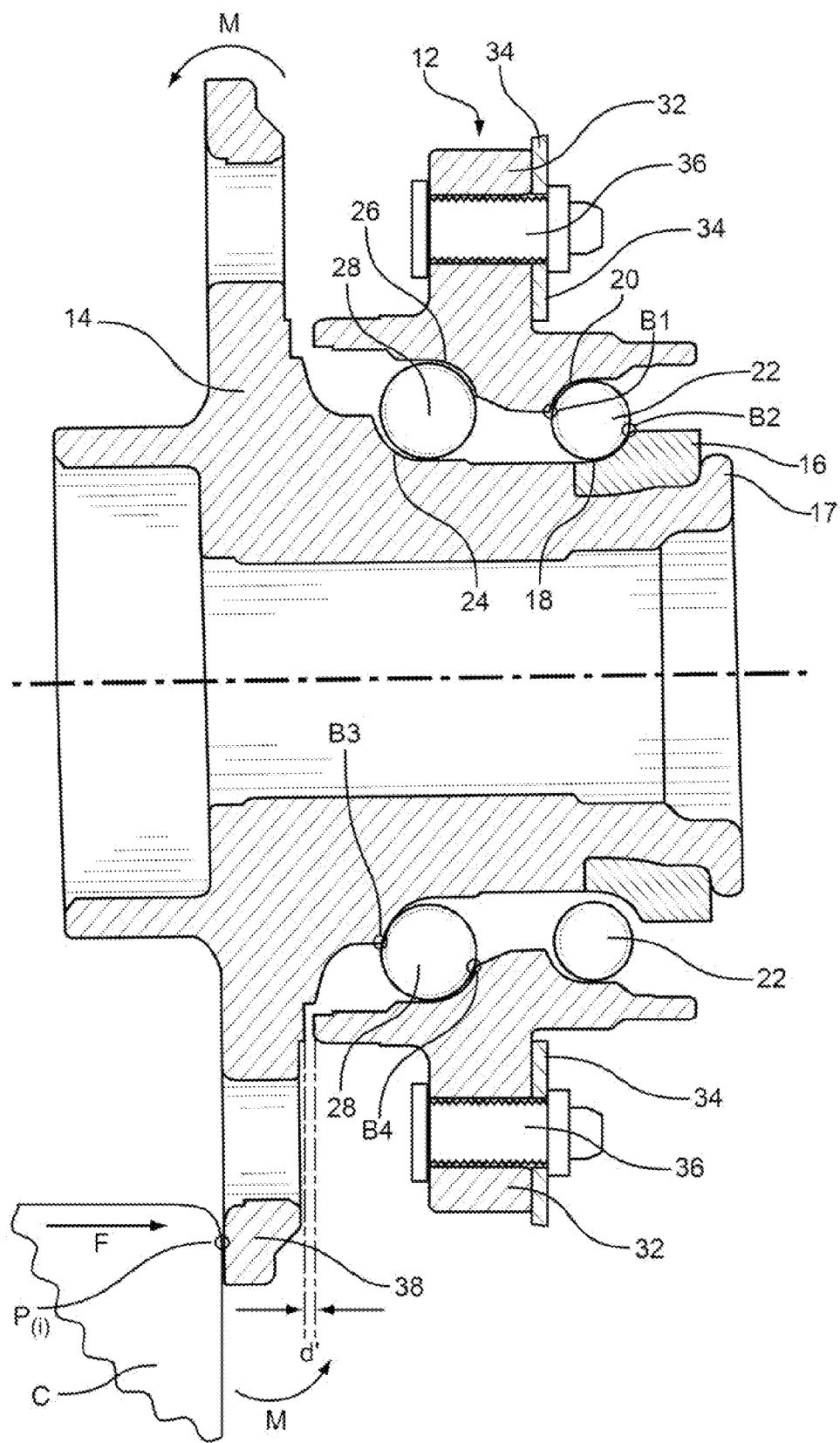
FIG. 2 is an illustration of the effects of a typical curb impact on existing bearing assemblies.

Referring to FIGS. 1 and 2, the problem of impact Brinell damage in existing wheel bearing assemblies is illustrated. Note that FIGS. 1 and 2 are not intended to accurately represent any particular prior art or existing assembly, but rather only to illustrate the problem. In FIG. 1, a representative existing wheel bearing assembly 10 is shown, having a non-rotating outer ring component 12, a rotating inner ring component 14, and an inboard inner bearing ring 16 clamped in place by an integrally formed rotating tab 17. Inboard inner bearing ring 16 defines an inboard inner bearing raceway 18, and non-rotating component 12 defines an inboard outer bearing raceway 20, which together encapsulate an inboard ballrow of ball components 22. Likewise, rotating component 14 defines an outboard inner bearing raceway 24 and non-rotating component 12 defines an outboard outer bearing raceway 26, to accommodate an outboard ballrow of ball components 28. Non-rotating component 12 includes an outer ring mounting flange 32 mounted to vehicle suspension structure 34 by bolts 36.

Turning to FIG. 2, a typical effect of a side impact to rotating component 14 by a curb C is illustrated. As shown, an offset force F to rotating component 14 at an impact point P(i) at a bottom region of a wheel mounting flange 38 causes a moment M which tends to bend or rotate rotating component 14 transversely to its axis in the counterclockwise direction as shown in the figure. Comparing FIG. 1 to FIG. 2, it is shown that an initial distance d separating the bottom region of wheel mounting flange 38 is reduced by the bending and/or rotation to a smaller distance d'. Also as a result of the bending and/or rotation, a preload condition of ball components 22 and 28 is quickly reduced, enabling the axial travel of wheel mounting flange 38 to push some of ball components 22 and 28 out of flush, centered alignment with the ballraces, particularly in the lower region of outboard bearing raceways 24 and 26 and in the upper region of inboard bearing raceways 18 and 20. In particular, with reference to FIG. 2, ball components 28 tend to run up against shoulder points B3 and B4 of bearing raceways 24 and 26, respectively, and ball components 22 tend to run up against shoulder points B1 and B2 of bearing raceways 20 and 18 respectively, resulting in stress concentrations at points B1-B4 that can cause significant impact Brinell damage at those points. A certain degree of impact Brinell damage to any of bearing raceways 18, 20, 24 and 26 will leave indents sufficient to generate an undesirable noise or vibration condition when rotating component 14 rotates relative to non-rotating component 12. Typically, noisy or vibrating bearing operation results from Brinell indents of about 3 microns (0.003 millimeter) in depth, depending upon bearing and/or ball component sizes and vehicle application.

With reference to FIGS. 3-6, a wheel bearing assembly with improved impact Brined resistance is now described.

Figure 3:
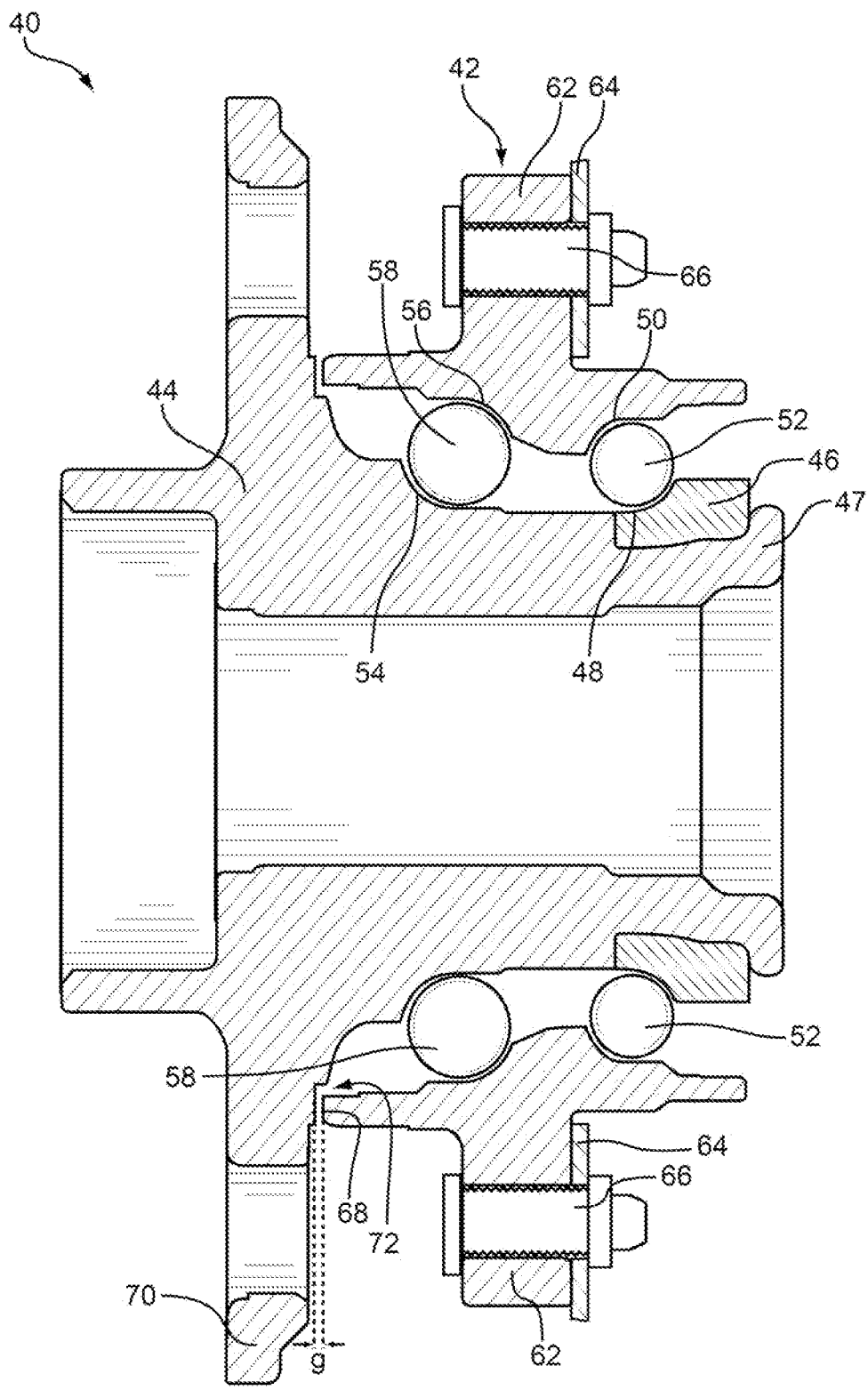
FIG. 3 is a side sectional illustration of a bearing assembly according to the present invention.

Turning to FIG. 3, a wheel bearing assembly 40 is shown which includes a non-rotating outer ring component 42, a rotating inner ring component 44, and an inboard inner bearing ring 46, clamped in place and retained in a fixed position with respect to rotating component 44 by an integrally formed rotating tab 47. It should be noted that the present invention, in any of its aspects, may also advantageously be embodied in non-self-retaining bearing assemblies or bearing assemblies employing other forms of retention, for example, those in which an inboard inner bearing ring is clamped in place by a Rzeppa shaft or stub shaft rather than by a tab integrally formed to a rotating component. Inboard inner bearing ring 46 defines an inboard inner bearing raceway 48, and non-rotating component 42 defines an inboard outer bearing raceway 50, which together encapsulate an inboard ballrow of ball components 52. Likewise, rotating component 44 defines an outboard inner bearing raceway 54 and non-rotating component 42 defines an outboard outer bearing raceway 56, to accommodate an outboard ballrow of ball components 58. Non-rotating component 42 includes a mounting flange 62 for mounting non-rotating component 42 to vehicle suspension structure 64, for example by bolts 66.

Figure 4:
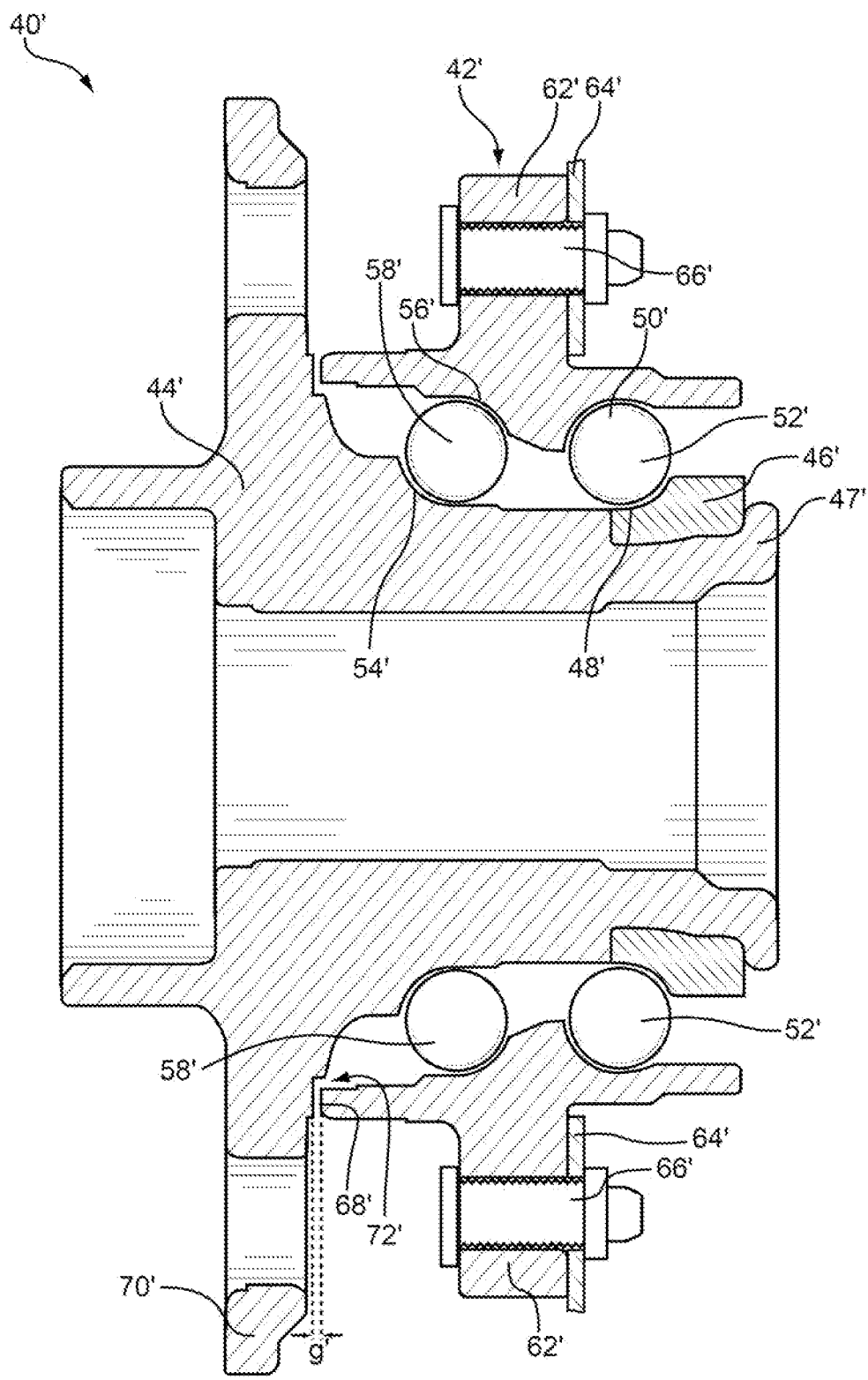
FIG. 4 is a side sectional illustration of another bearing assembly according to the present invention.
Figure 5:
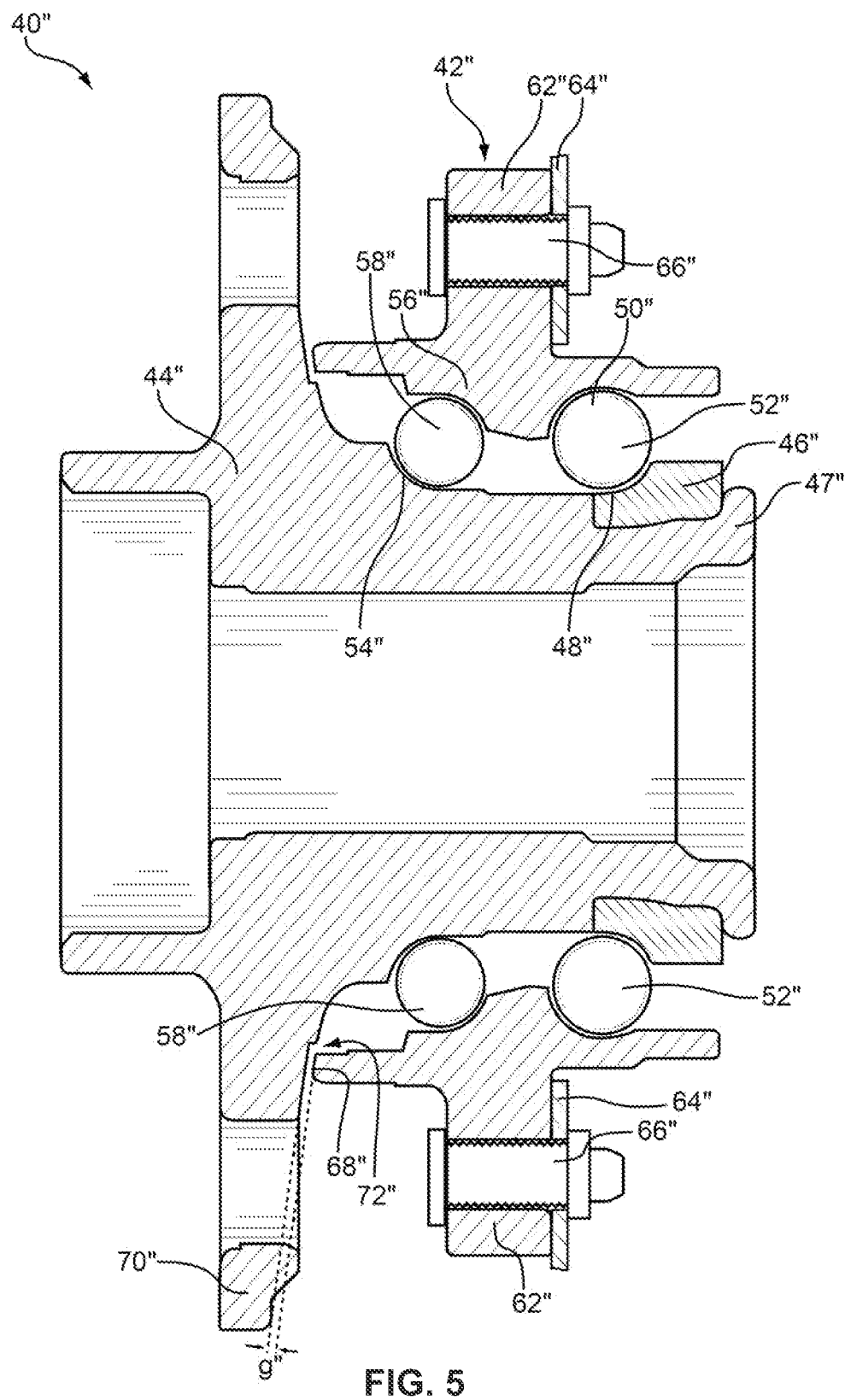
FIG. 5 is a side sectional illustration of still another bearing assembly according to the present invention.
Figure 6:
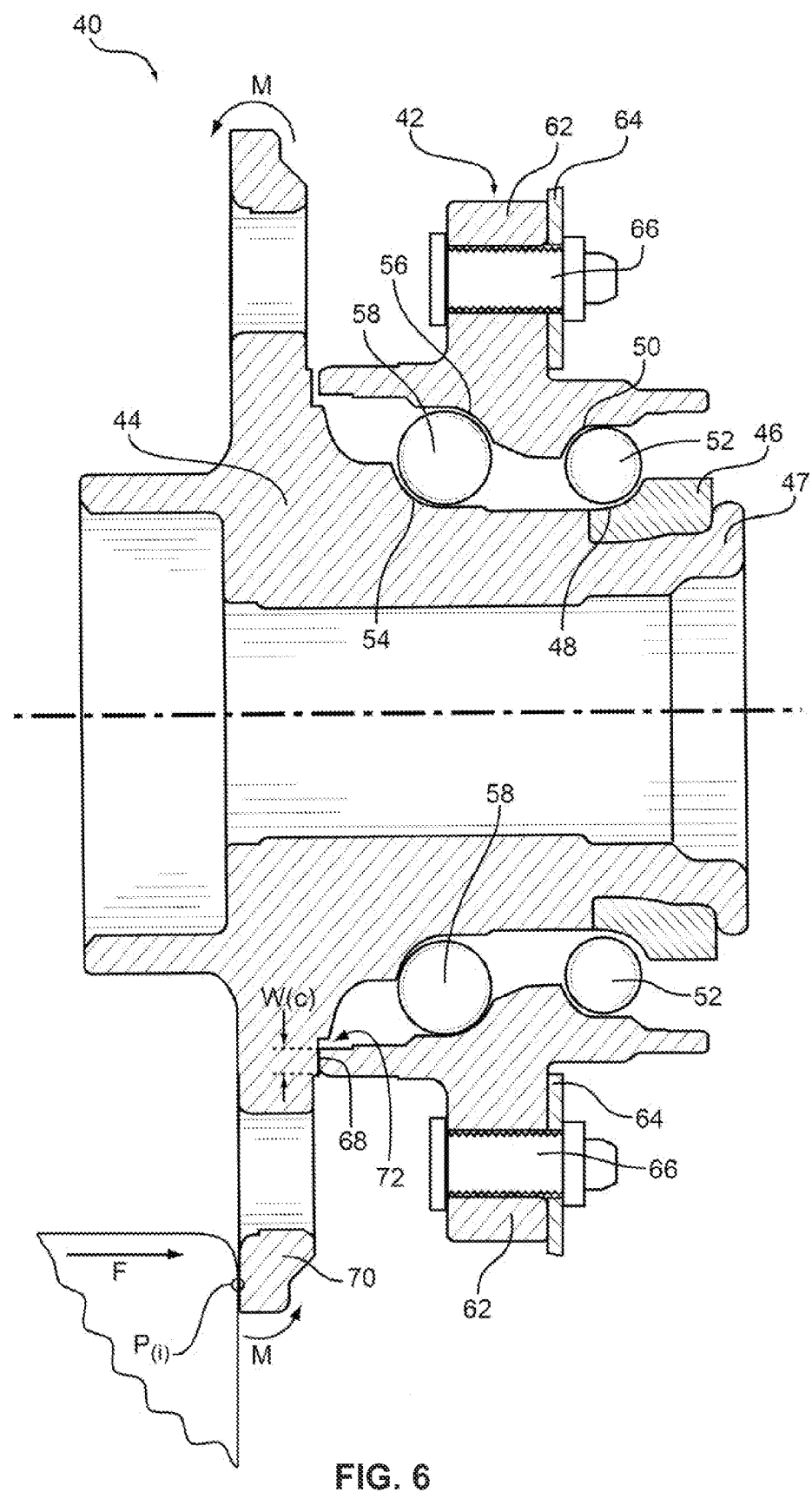
FIG. 6 is a side sectional illustration of a bearing assembly according to the present invention reacting to a typical curb impact.

While wheel bearing assembly 40 includes larger outboard ball components 58 and smaller inboard ball components 52, wheel bearing assembly 40' having ball components 52' and 58' of equal diameter and wheel bearing assembly 40" having an inboard ball component 52" larger than an outboard ball component 58" are also within the scope of the present invention, as shown in FIGS. 4 and 5, respectively.

Additionally, as shown in FIGS. 3-5, an outboard end face 68 of non-rotating component 42 is separated from a wheel mounting flange 70 of rotating component 44 by a controlled gap g. In the event of a sufficient side impact to rotating component 44, such as the impact with curb C illustrated in FIG. 6, wheel mounting flange 70 traverses the distance of controlled gap g and moves into contact with outboard end face 68. Thereafter, any additional load imparted to rotating component 44 is shared by non-rotating component 42, and the relative rigidity of non-rotating component 42 at least substantially prevents further inboard axial travel of wheel mounting flange 70, thus at least substantially preventing further bending or inboard rotation of rotating component 44 and at least substantially preventing a resulting increase in the peak load transmitted through ball components 52 and 58 into bearing raceways 48, 50, 54 and 56. It should be noted that gap g need not be aligned perpendicular to the axis of rotating component 44. As depicted in FIG. 5, gap g" is oblique to the axis. It is believed that end face 68 and the portion of mounting flange 70 that contacts it being at an angle less than 90° with respect to the axis, such as about 75°, promotes more flush surface-to-surface contact between these opposed surfaces in a curb impact event, due to the resultant peak impact load vector associated with the curb impact being typically offset below the axis, resulting in a displacement of the portion of mounting flange 70 in a general direction that is slightly inclined with respect to the vehicle axis. In practice, the inventors have found that Brinell depths tend to be smaller for an obliquely inclined gap than for a perpendicular gap of the same gap dimension, the gap dimension in both cases being measured normal to the opposed surfaces. In other embodiments (not shown), outboard end face 68 need not have a straight-line profile, but may have any profile that is complementary so as to mate with the inboard face of wheel mounting flange 70.

Also, because the axial travel of rotating component 44 towards non-rotating component 42 is limited, so is the shifting of ball components 52 and 58 out of flush alignment with their respective bearing raceways, thus substantially avoiding the stress concentrations high on the shoulders of bearing raceways that tend to result from side impacts to existing bearing assemblies, without the need to increase bearing raceway shoulder heights. For example, the present inventors have found that when the width of controlled gap g was about 0.13 millimeter, the deepest Brinell impact indents resulting from curb impact simulations were located at a radial height on the bearing raceways of only about 30% of the diameter of ball components having a diameter of about 13 millimeters. This is a significant benefit as lower shoulder heights result in lower processing costs and lower wheel bearing assembly torque. With ball components 52 and 58 remaining substantially flush with their respective raceways, the peak load condition is reduced to a total ballrace complement load, and all ball components 52 and 58 of bearing assembly 40 are approximately equally stressed. The result is that wheel bearing assembly 40 can withstand a greater side impact than a similar wheel bearing assembly with a larger gap between its rotating component and non-rotating component, without any of bearing raceways 48, 50, 54 and 56 incurring enough Brinell impact damage to generate a noise condition.

Another significant advantage of controlled gap g is that the close proximity of non-rotating and rotating components 42 and 44 results in a built-in labyrinth 72 which helps to keep debris out of the side of bearing assembly 40 adjacent controlled gap g. This should allow a seal component (not shown) to be made smaller or simpler to reduce frictional torque in bearing assembly 40.

While contact between rotating component 44 and non-rotating component 42 is desirable during an impact event to reduce the load transmitted through ball components 52 and 58, excessive contact between these components during driving can create undesired friction or even itself generate noise and/or vibration. This is particularly a concern with regard to extreme cornering maneuvers that may place enough inboard stress on rotating component 44 to bring it into contact with non-rotating component 42. Therefore, the width of controlled gap g should be optimized to provide improved impact Brinell resistance while nonetheless avoiding excessive contact during driving. Moreover, the width W(c) of the potential contact area between rotating and non-rotating components 44 and 42 is also critical, as a wider contact width W(c) will generate more friction and potentially noise or vibration, whereas a narrower contact width W(c) will result in less load sharing by non-rotating component 42. Hence, the contact width W(c), should also be optimized, for example by controlling the width of non-rotating component outboard end face 68. The optimal parameters can change if certain specs of the assembly are modified, for example, the rotating component flange thickness, rotating component flange design, bearing raceway shoulder heights, and number and diameter of the ball components. The present inventors have found that for a bearing assembly wherein wheel mounting flange 70 has a thickness of about 8-12 mm and bearing raceways 48, 50, 54 and 56 have shoulder heights of about 30-40% of the diameters of their corresponding ball components 52 and 58, a width of controlled gap g of from about 0.04 millimeter to about 0.30 millimeter and a contact width W(c) of from about 2 millimeters to about 5 millimeters provide good impact Brinell resistance and avoid excessive friction, noise or vibration during maneuvers that cause inboard strain on rotating component 44. As bearing raceway shoulder heights of about 45-50% of the ball diameter are common in the industry, good impact Brinell resistance at shoulder heights of about 30-40% of the ball diameter is a surprising benefit achieved by bearing assemblies according to the invention, with significant savings in processing cost and bearing assembly torque.

Figure 7:
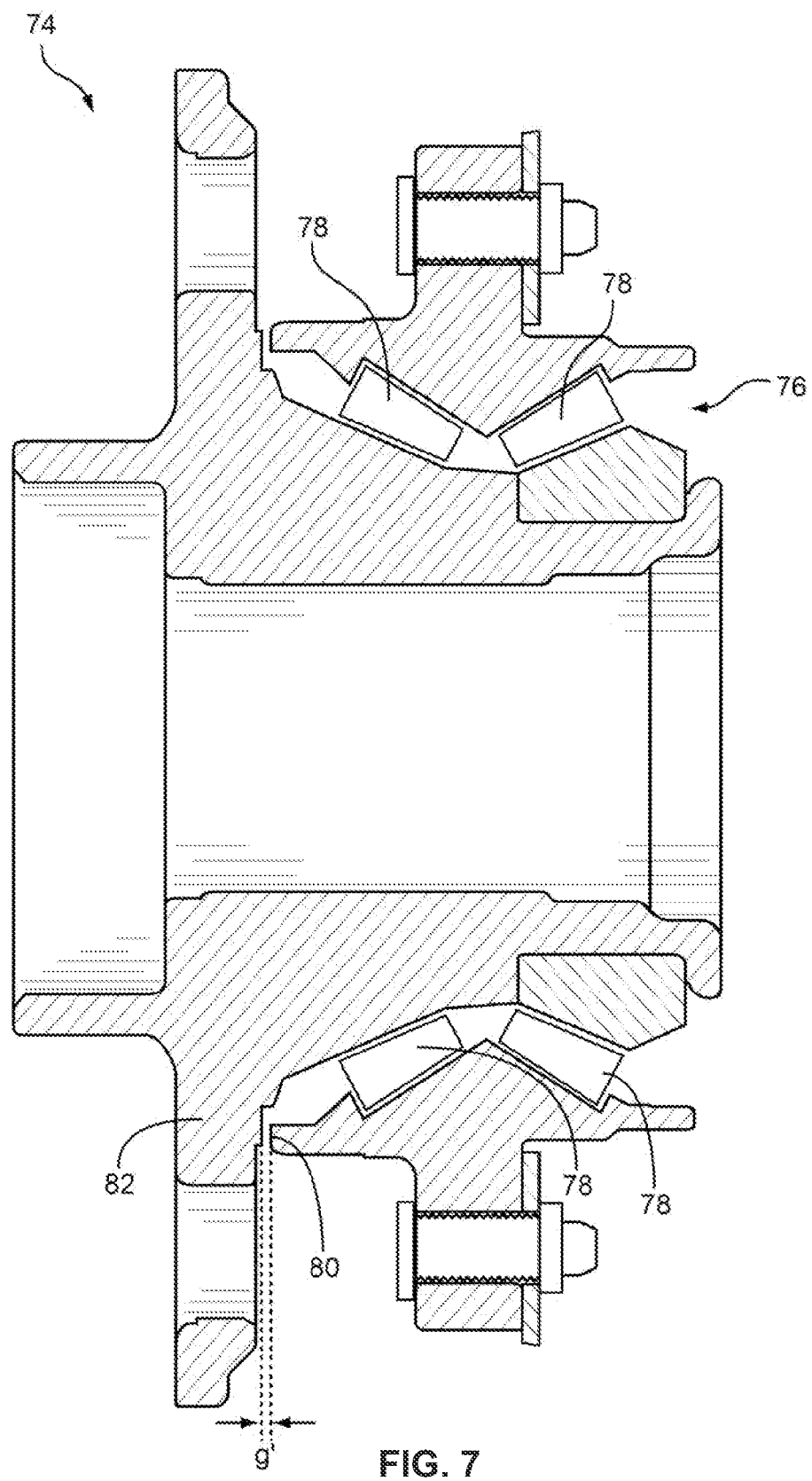
FIG. 7 is a side sectional illustration of a bearing assembly according to the present invention having tapered rollers.

It should be noted that many variations in bearing assemblies are permitted by the present invention. For example, bearing assemblies having rolling elements other than balls, including but not limited to tapered rollers, are within its scope. Turning to FIG. 7, a tapered roller bearing assembly 74 according to the present invention is illustrated. Assembly 74 is essentially similar to assembly 40 except in that it incorporates tapered rollers 78 instead of balls as its rolling elements. The spaced relationship between non-rotating component outboard end face 80 and rotating component flange 82 defining a controlled gap designated g' is similar in structure and function to that described above with reference to FIGS. 3-6. Similarly, other types of rolling elements, or combinations of one type of rolling element in the inboard raceway and another in the outboard raceway, could be substituted for the tapered rollers or balls shown in FIGS. 3-7 without substantially affecting the inventive aspects of a wheel bearing assembly according to the present invention.

Figure 9:
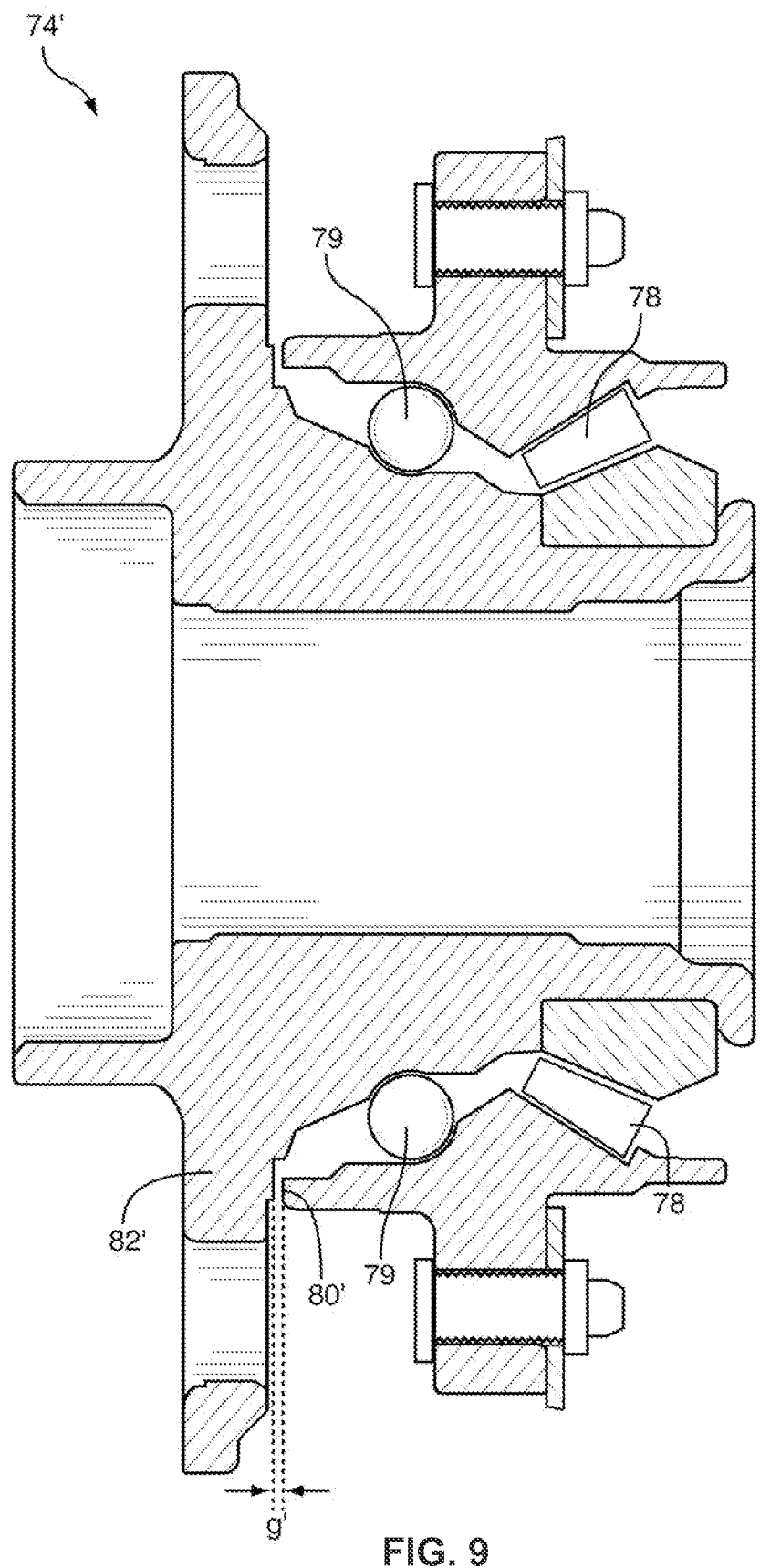
FIG. 9 is a side sectional illustration of a bearing assembly according to the present invention having a combination of balls and tapered rollers.

Other variations are also possible within the present invention. For example, assemblies having bearing rings that are separate from a non-rotating component and a rotating component, assemblies having only a single bearing raceway and ballrow, assemblies having combinations of balls and tapered rollers or other rolling elements, and assemblies in which the rotating component is the outer ring component instead of the inner ring component are also within the scope of the present invention. For instance, depicted in FIG. 9 is an alternative bearing assembly 74' which is similar to tapered roller bearing assembly 74, but having inboard tapered rollers 78 replaced by balls 79, and a non-rotating component outboard end face 80' and rotating component flange 82' defining controlled gap g'. Moreover, although the embodiments illustrated in FIGS. 3-7 closely resemble a "generation III" type of bearing assembly, the present invention can also be advantageously embodied in bearing assemblies having the general configuration of generation 0, I or II bearing assemblies, as long as a wheel-mounting component is permitted to contact and transmit a load to a component fixed with respect to the vehicle suspension structure, or directly to the vehicle suspension structure itself, in the event of a side impact which would ordinarily cause Brinell impact damage sufficient to generate a noise or vibration condition, but which does not cause sufficient damage due to the load sharing by the non-rotating component.

Figure 8:
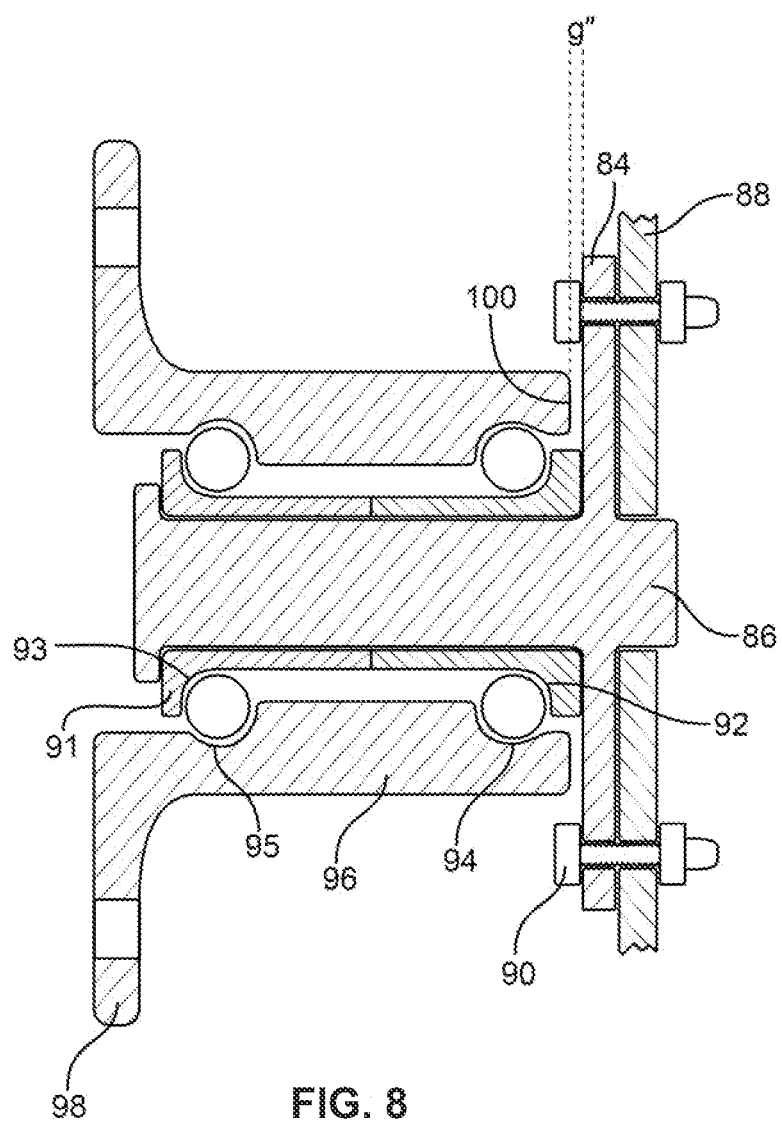
FIG. 8 is a side sectional illustration of a bearing assembly according to the present invention in which an outer ring component is the wheel mounting component.

An example of a bearing assembly according to the present invention more related to a "generation II" assembly, in that the rotating component is the outer ring component, is illustrated in FIG. 8. As shown, a flange 84 of a non-rotating component 86 is mounted to a vehicle suspension structure 88 by bolts 90. A two-piece inner bearing ring 91, defining inner bearing raceways 92 and 93, is clamped fixedly around non-rotating component 86, and outer bearing raceways 94 and 95 are formed in a rotating outer ring component 96 having a wheel mounting flange 98. In this embodiment, a controlled gap g" between an inboard end face 100 of rotating component 96 and non-rotating component flange 84 is optimized to be small enough to limit inboard axial travel of rotating component 96 to substantially prevent noise or vibration generating Brinell damage in the event of an offset side impact to wheel mounting flange 98, yet large enough to avoid excessive contact between rotating component 96 and non-rotating component 86 during extreme driving maneuvers, as discussed above with reference to FIGS. 3-6. It should also be noted that in some assemblies within the scope of the invention, the relevant controlled gap could be between an inboard end face of a rotating component and a part of a vehicle suspension structure itself.

Figure 10:
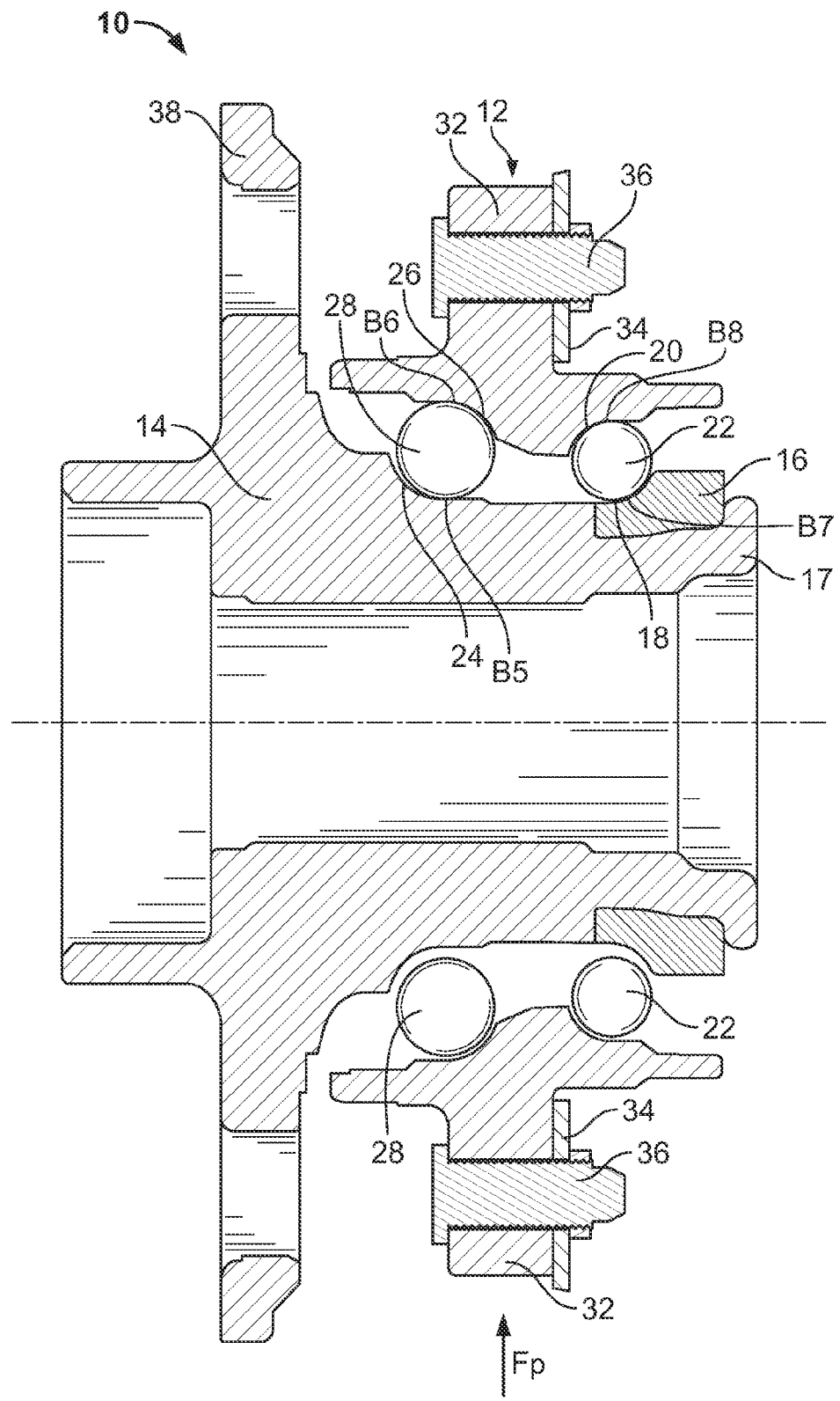
FIG. 10 is a side sectional illustration of the brinelling effects of a typical pothole impact on the existing wheel bearing assembly illustrated in FIG. 1.

While the foregoing embodiments of the invention generally relate to improving resistance to brinelling from lateral/axial impacts, such as low-speed curb impacts, brinelling may also result from radial/road surface impacts, such as pothole impacts. The brinelling effects of a typical pothole or similar impact are illustrated in FIG. 10 for the typical existing wheel bearing assembly 10 shown in FIG. 1. In particular, a radial force tends to cause brinelling as indicated at B5, B6, B7, B8, in regions of raceways 18, 20, 24, and 28 generally on the opposite side of the wheel axis from the point of impact. In the case of a typical pothole impact, the deepest Brinell indentations would thus likely occur in upper-rear quadrants of the raceways. It has also been found that outboard raceways are typically more susceptible to brinelling from pothole impacts than inboard raceways, because contact of tires with the road surface is typically centered about a vertical plane that is closer to the outboard ballrow than the inboard ballrow. Pothole impact Brinell indents also tend to be centered low on the raceway profiles, because unlike a curb impact, a pothole impact does not tend to shift the ball components laterally. Accordingly, maximum outboard brinelling is typically observed at B5 and B6 and is typically greater than the maximum inboard brinelling occurring at B7 and B8. As with lateral-impact brinelling, radial-impact brinelling indentations of about 3 microns or deeper tend to result in undesirable noise and vibration during continued use of a bearing, while field warranty returns of passenger vehicles indicate that such Brinell depths frequently result from pothole impacts. Testing performed by the inventors indicates that the minimum static radial load required to cause 3-micron Brinell depths in a typical passenger vehicle wheel bearing assembly is on the order of 120-200 kN, which is about three times the static axial load required to produce 3-micron brinelling. However, pothole impact load magnitudes are often far greater than curb impact load magnitudes, because a vehicle often hits a pothole straight on at road speeds such as 25-30 mph or even greater, in contrast to curb impacts which are typically oblique impacts at parking speeds on the order of 3 mph. For this reason, pothole impacts often do result in 3-micron brinelling of existing wheel bearing assemblies.

It should be noted that, in contrast to the static-loading conditions tested in the development of wheel bearing assemblies according to the invention, the loading curve from an actual vehicular impact is dynamic, typically reaching a transient peak force very quickly, very quickly falling off to a relatively steady level, and then either leveling off or continuing to decrease at a more gradual rate. Thus, the static test load magnitudes referred to herein should not be confused with a typically much higher peak load magnitude momentarily incurred in actual curb or pothole impact causing the same or equivalent deformation or damage as the tested static load. Whether 3-micron brinelling results from an impact depends on additional variables besides peak load magnitude, and so rather than attempting to define a threshold peak impact load magnitude at which 3-micron brinelling occurs, which may vary considerably, the present inventors empirically determined "equivalent" threshold static loads at which 3-micron brinelling occurs, these equivalent threshold static loads serving as reference points for testing the performance of prototype assemblies. The same or similar apparatus and procedures as used for crash-worthiness testing, such as weighted sleds that impact the front wheel corner assembly on a vehicle, may be used to simulate actual lateral and/or axial impact loading that may occur during driving to test the performance of wheel bearing assemblies according to the invention.

Figure 11A:
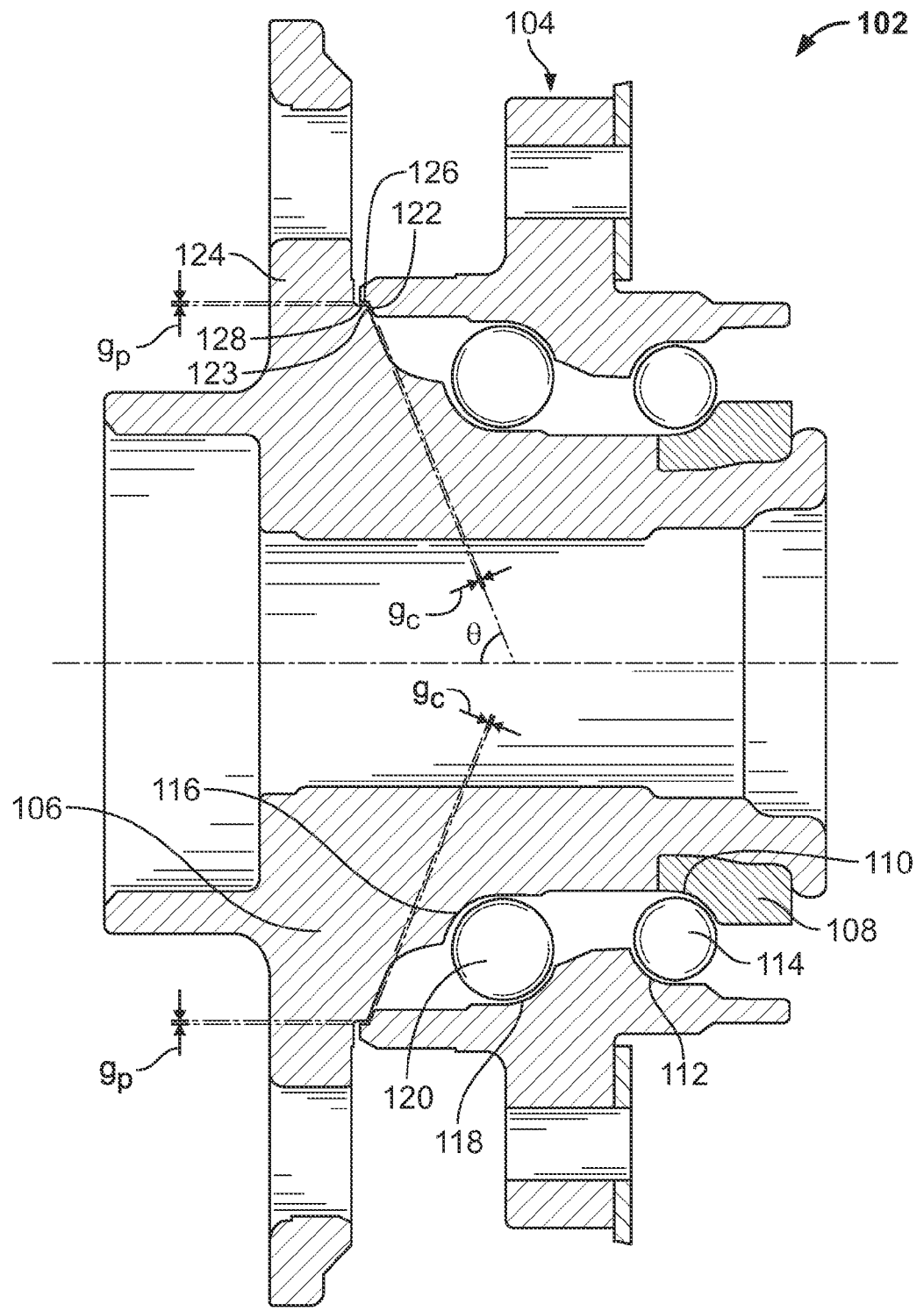
FIG. 11A is a side sectional illustration of a bearing assembly according to another aspect of the present invention.
Figure 11B:
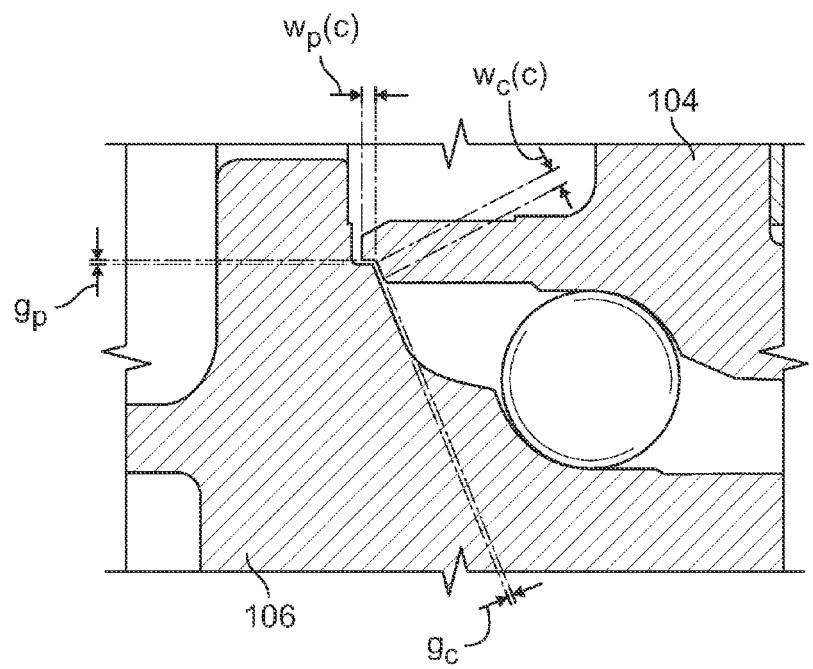
FIG. 11B is an enlarged fragmentary side sectional illustration of a supporting contact region of the bearing assembly illustrated in FIG. 11A.
Figure 12:
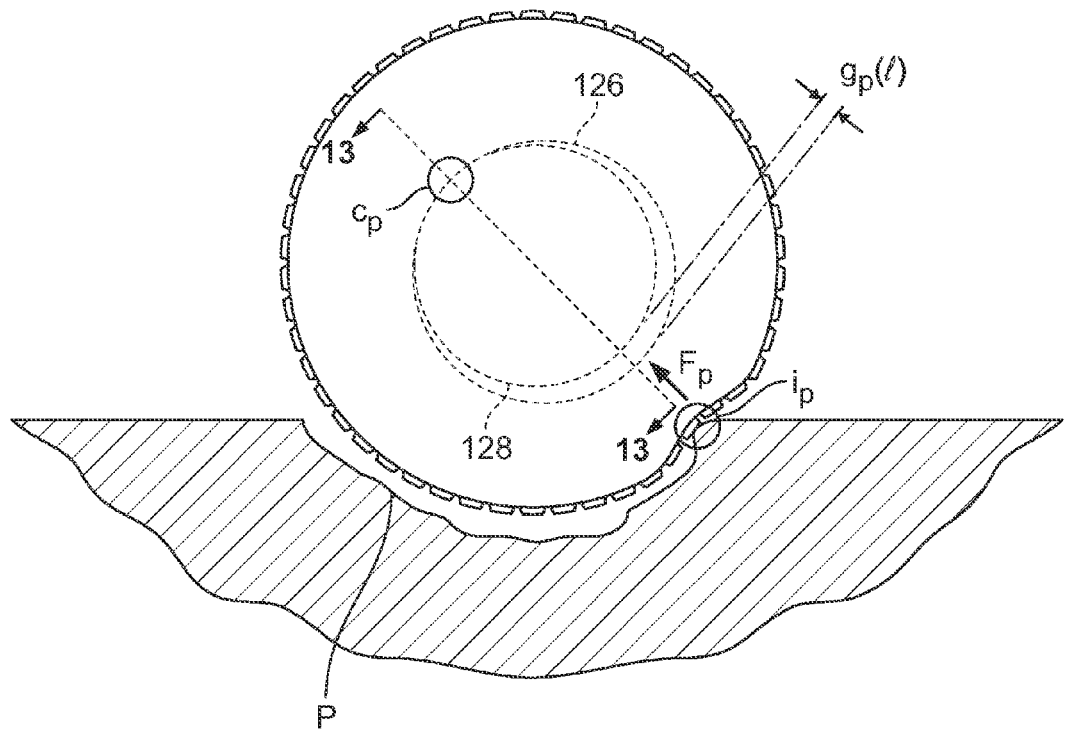
FIG. 12 is a schematic side illustration of supporting contact provided by a wheel bearing assembly as illustrated in FIG. 11A in response to a pothole impact.
Figure 13:
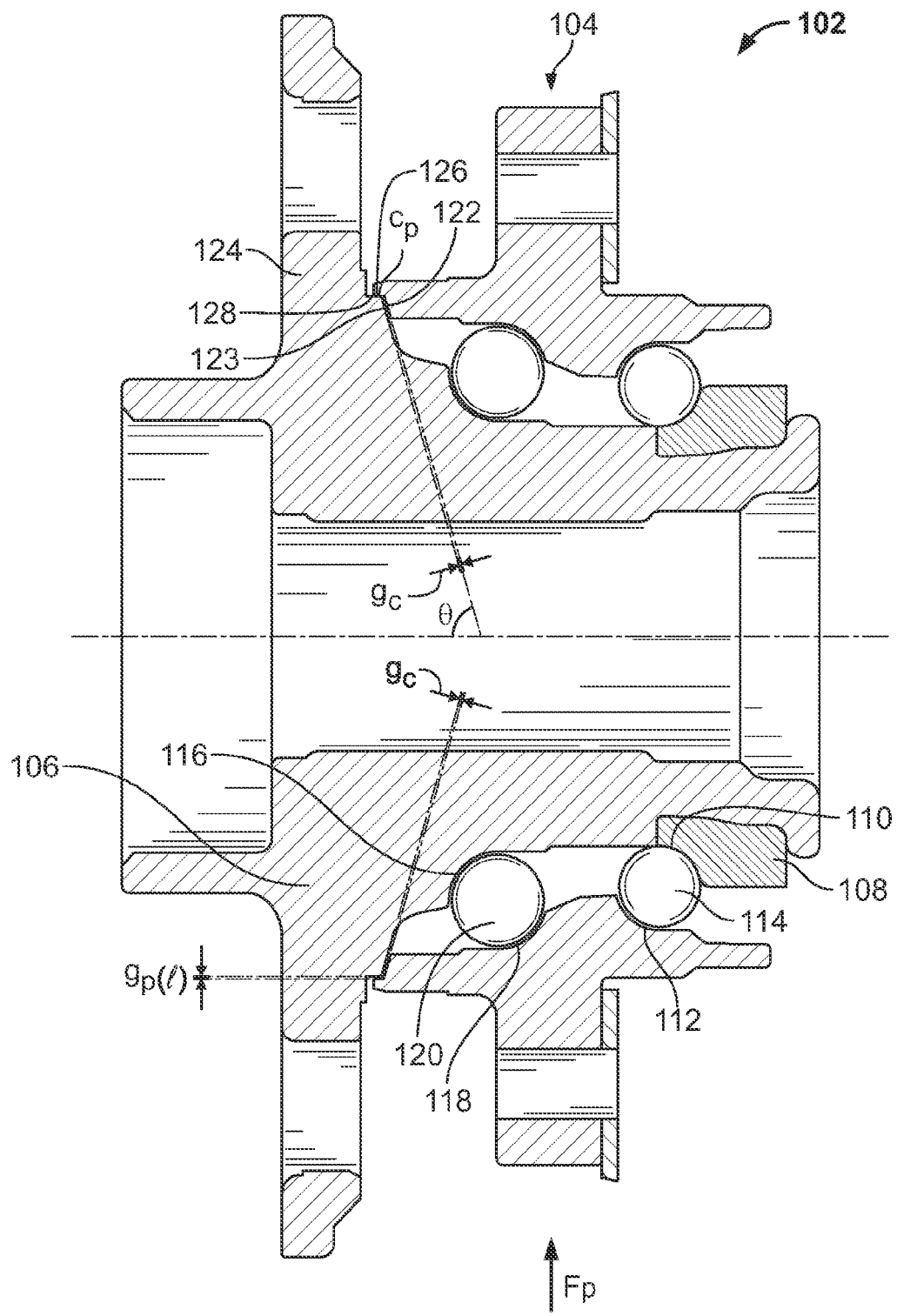
FIG. 13 is a fragmentary side sectional illustration of the bearing assembly illustrated in FIG. 11A, illustrating the radial supporting contact provided in the event of a radial impact such as illustrated in FIG. 12.

Thus, in accordance with another aspect of the invention, with reference to FIGS. 11A-17, vehicle wheel bearing assemblies are described and illustrated which provide resistance to brinelling from radial impacts, either in addition to or instead of side-impact brinelling resistance. Turning to FIG. 11A, a radial- and side-impact resistant wheel bearing assembly 102 is depicted, which includes a non-rotating outer ring component 104, a rotating inner ring component 106, and an inboard inner bearing ring 108, an inboard inner bearing raceway 110, an inboard outer bearing raceway 112, an inboard ballrow of ball components 114, an outboard inner bearing raceway 116, an outboard outer bearing raceway 118, and an outboard ballrow of ball components 120. A radially inner surface 126 of non-rotating component 104 is separated from a radially outer surface 128 of wheel mounting component 106 by a radial controlled gap $g_p$. As illustrated in FIGS. 12 and 13, in the event of a radial (pothole) impact $F_p$ of sufficient magnitude, surface 128 will shift upwardly and rearwardly into contact with surface 126 at a contact region $c_p$ FIG. 13

Load-diverting contact between surface 126 and surface 128 initiates at a contact-threshold peak radial impact load that is insufficient to cause 3-micron brinelling. Loads at or below the threshold magnitude, may thus be borne entirely by ball components 114, 120 and raceways 110, 112, 116, and 118 without resulting in perceptible noise or vibration during subsequent driving. For greater impact loads, the load portion by which the threshold magnitude is exceeded is nearly entirely diverted to the vehicle suspension structure through surfaces 126, 128 thus effectively preventing the raceways from incurring impact loads significantly greater than the contact-threshold load, which is preferably significantly less than a noise- or vibration-producing impact load. The present inventors believe that a radial gap clearance between surfaces 126, 128 corresponding to a contact-threshold static load that is significantly smaller than a static load that results in 3-micron brinelling (the latter being typically on the order of 120-200 kN as mentioned above) will also correspond to a contact-threshold impact load being significantly smaller than an impact load that results in 3-micron brinelling. A radial gap $g_p$ of at most about 0.15 millimeters, providing supporting contact under a radial load of approximately 120-150 kN, is typically small enough to achieve this aim. On the other hand, to avoid excessive friction from incidental contact, such as from sudden acceleration and braking and/or corrosion of opposed surfaces 126, 128, gap $g_p$ is advantageously at least about 0.040 millimeters. Similarly, with reference to FIG. 11B, supporting surfaces 126 and 128 are preferably disposed to provide a pothole-impact supporting contact width $w_p(c)$ of at least about 2 mm, to provide sufficient load-diverting support; but no more than about 5 mm, to avoid excessive friction from incidental contact.

Advantageously, radial-impact supporting contact may be provided in addition to lateral-impact supporting contact similar to that described in detail in the embodiments of the invention described and illustrated above with reference to FIGS. 3-9. Thus, similarly to the inclined outboard end face 68" of bearing assembly 40" illustrated in FIG. 5, an inclined outboard end face 122 of non-rotating component 104 is separated axially from an inclined surface 123 adjacent wheel mounting flange 124 of rotating component 106 by an obliquely oriented controlled gap $g_c$. In a preferred embodiment, end face 122 and inclined surface 123 are inclined relative to the wheel mounting axis by an angle $\theta \approx 75°$ and aligned so as to provide a curb-impact supporting contact width $w_c(c)$ of at least about 2 millimeters and no more than about 5 millimeters.

Further, grease or other suitable cavity-filling lubricant may optionally be provided in or near gaps $g_p$, $g_c$ or contact surfaces 122, 123, 126, 128 which define the gaps, advantageously inhibiting corrosion (which is particularly important in regions with very small clearances to avoid rubbing or locking of components).

In FIGS. 11A-11B, radial/pothole-impact supporting gap gp and lateral/curb-impact supporting gap $g_c$ of bearing assembly 102, and the surfaces that define the gaps are illustrated as being directly adjacent to each other, the surfaces of non-rotating component 104 defining a continuous concave region, and those of wheel-mounting component 106 defining a continuous convex region complementary to the concave region of non-rotating component 104. This is a preferred but non-limiting arrangement of supporting-contact surfaces. Other possible arrangements are depicted in FIGS. 14-18 as described below.

Figure 14:
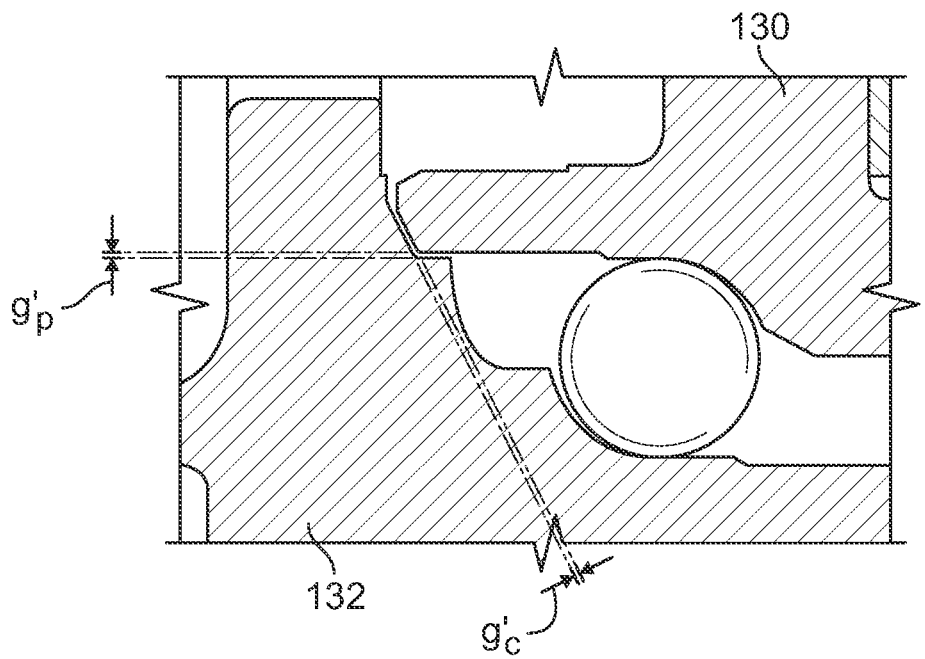
FIG. 14 is a fragmentary side sectional illustration of a supporting contact region of another embodiment of a side- and radial-impact resistant wheel bearing assembly.

Illustrated in FIG. 14 is an alternative arrangement of supporting contact surfaces in which the aforementioned concavity is reversed. Thus, a non-rotating component 130 includes a convex-angled region and a wheel-mounting component 132 includes an opposed complementary concave-angled region, the opposed complementary regions defining a radial pothole-impact gap $g'_p$ and an inclined curb-impact gap $g'_c$.

Figure 15:
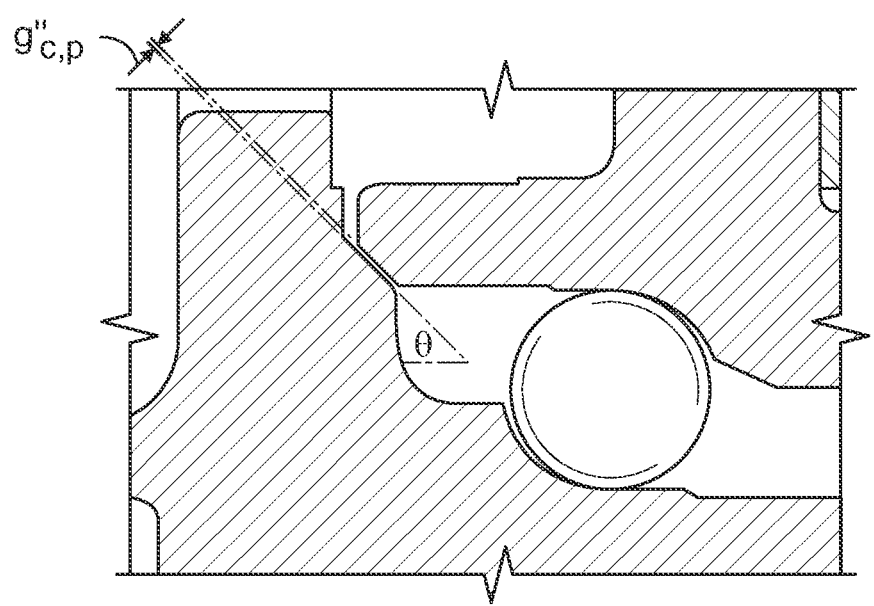
FIG. 15 is a fragmentary side sectional illustration of a supporting contact region of yet another embodiment of a side- and radial-impact resistant wheel bearing assembly.

Another alternative gap arrangement is depicted in FIG. 15, in which a single inclined gap $g''_{c,p}$ at a uniform angle of inclination is provided. This embodiment is distinct from that illustrated in FIG. 5 (also characterized by a single inclined gap) in that a smaller angle θ relative to the wheel mounting axis and/or a wider contact region is provided to produce a pothole impact contact region having a sufficient effective width to inhibit pothole impact brinelling, to the extent that this is possible without exceeding the permissible maximum width of curb impact supporting contact, to avoid excessive friction from any incidental contact due to lateral, non-impact forces. Due to the challenge of addressing all of the foregoing concerns with a single, uniformly inclined gap, the embodiment illustrated in FIG. 15 is not preferred, though it may be feasible and is within the scope of the invention.

Figure 16:
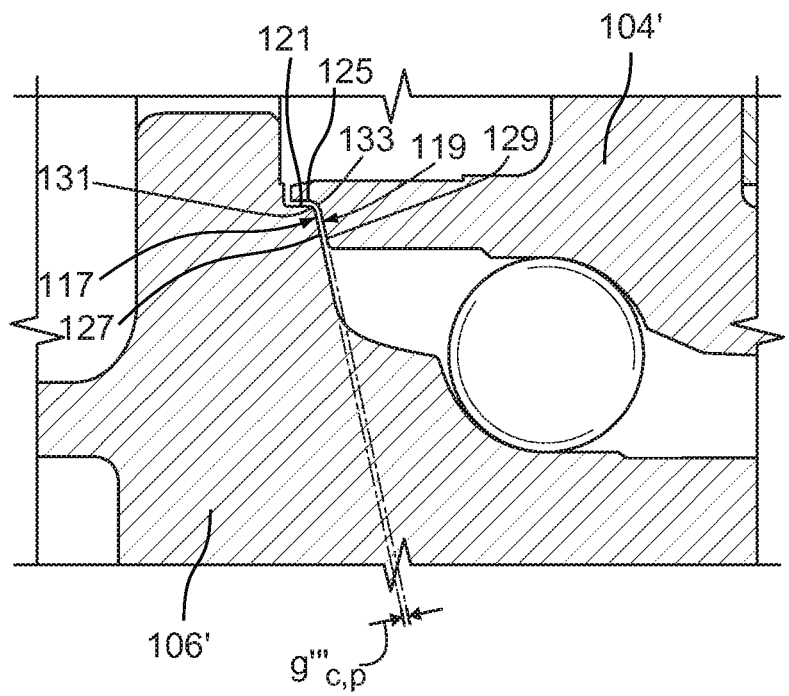
FIG. 16 is a fragmentary side sectional illustration of a supporting contact region of still another embodiment of a side- and radial-impact resistant wheel bearing assembly.

With reference to FIG. 16, yet another alternative gap arrangement of a non-rotating component 104' and a wheel mounting component 106' is illustrated. A curved-profile gap $g'''_{c,p}$ is defined by opposed rotating and non-rotating surfaces 117, 119, in which more horizontally/axially oriented upper regions 121, 125 of the opposed surfaces provide resistance to radial/pothole impact brinelling, and more vertically/radially oriented regions 127, 129 of the opposed surfaces provide resistance to lateral/curb impact brinelling, the radial/pothole impact resistance and lateral/curb impact resistance regions of the opposed surfaces meeting at respective curved regions 131, 133. While the wheel mounting component 106' of FIG. 16 is illustrated as including a convex surface and the non-rotating component 104' as including a complementary concave surface, this relationship could be reversed in an alternative embodiment (not shown).

Figure 17:
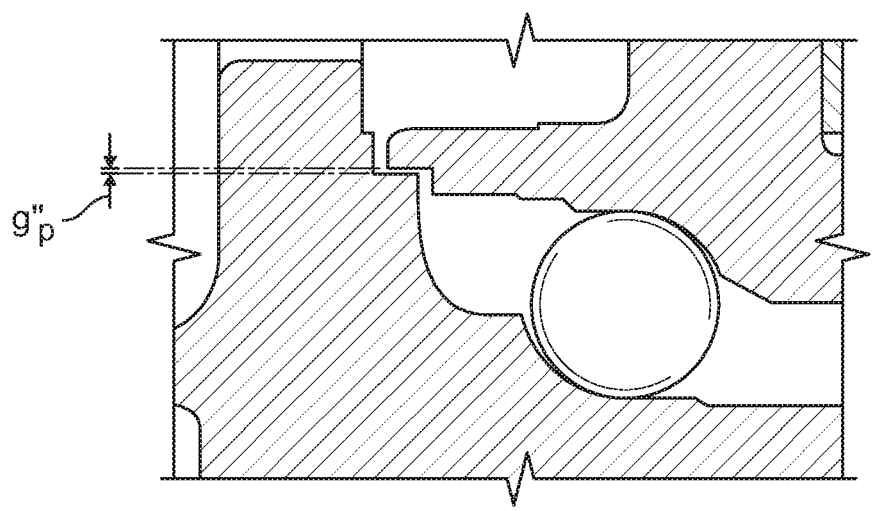
FIG. 17 is a fragmentary side sectional illustration of a supporting contact region of a radial-impact resistant only wheel bearing assembly according to another aspect of the invention.

Turning to FIG. 17, still another alternative arrangement is illustrated in which only pothole-impact brinelling resistance is provided, by providing a small radial gap $g''_p$. Although it is advantageous to provide resistance to brinelling from both axial and radial impacts, some benefit is provided by resistance only to one or the other.

Figure 18:
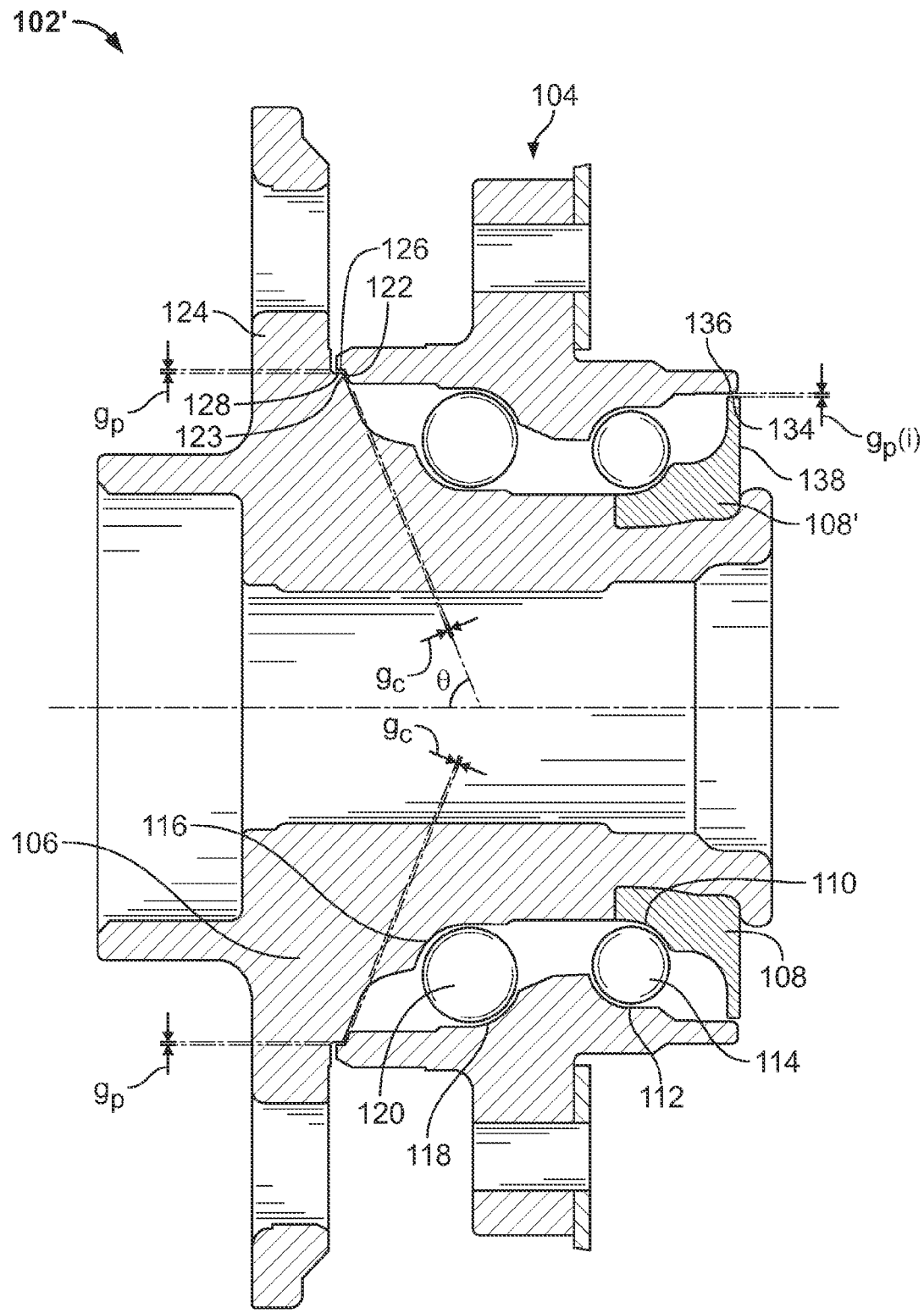
FIG. 18 is a side sectional illustration of another bearing assembly according to the invention which includes inboard radial impact supporting surfaces.

Turning to FIG. 18, yet another alternative wheel bearing assembly 102' is depicted. Bearing assembly 102' includes all of the features of bearing assembly 102 described and illustrated above with reference to FIGS. 11A, 11B, and 13, in addition to which radial/pothole-impact supporting contact surfaces 134 and 136 are also provided at the inboard side of ball components 114. Contact surface 134 is a radially outer face of an extension flange 138 of an alternative inboard inner bearing ring 108', while contact surface 136 is a portion of a radially inner surface of non-rotating component 104 substantially as found in bearing assembly 102. An arrangement such as in bearing assembly 102' is not considered a preferred embodiment at the time of filing, as a pothole impact load is typically centered closer to the outboard ballrow than the inboard ballrow, rendering inboard supporting contact less effective than outboard supporting contact, when other parameters such as gap clearance and contact area are equal. However, a bearing assembly providing inboard pothole impact relieving contact, either in addition to outboard contact as in bearing assembly 102', or instead of outboard contact (not shown), may be feasible, especially in the case of a non-drive bearing, in which an inboard seal may be more easily omitted in favor of load-transmitting structure such as extension flange 138 or a suitable cap (not shown), the cap incorporating one or both contact surfaces through which excessive radial impact loading may be transmitted, bypassing the raceways.

Figure 19:
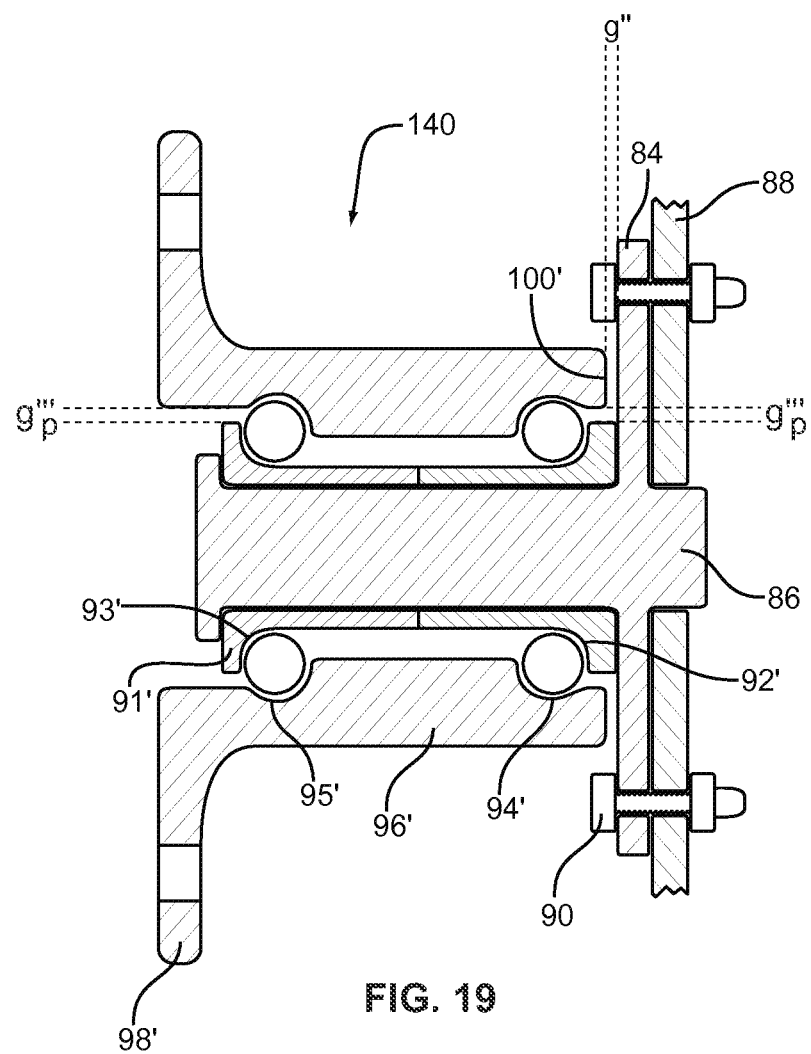
FIG. 19 is a side sectional illustration of another bearing assembly according to the invention in which radial impact and axial impact supporting surfaces are provided in a wheel bearing assembly having an outer raceway integral with a wheel mounting component.

Turning to FIG. 19, still another alternative wheel bearing assembly 140 is depicted. Assembly 140 is similar to the side impact brinelling resistant "generation II" assembly depicted in FIG. 8, but configured to provide radial/pothole impact brinelling resistance in addition to lateral/curb impact brinelling resistance. As in the FIG. 8 assembly, flange 84 of non-rotating component 86 is bolted to vehicle suspension structure 88 by bolts 90. A two-piece inner bearing ring 91', defining inner bearing raceways 92' and 93', is clamped fixedly around non-rotating component 86, and outer bearing raceways 94' and 95' are formed in a rotating outer ring component 96' having a wheel mounting flange 98'. In addition to controlled gap g" between an inboard end face 100' of rotating component 96' and non-rotating component flange 84, as described above with reference to FIG. 8, assembly 140 includes respective outboard and inboard radial gaps $g'''_p(o)$ and $g'''_p(i)$ between respective outboard and inboard radially inner surfaces of rotating outer ring component 96' and corresponding respective outboard and inboard radially outer surfaces of inner bearing ring 91'. The dimensions and positions of rotating outer ring component 96' and/or inner bearing ring 91' may be configured to control a dimension of either or both of gaps $g'''_p(o)$ and $g'''_p(i)$, thus providing supporting contact to inhibit brinelling in the event of a radial impact.

While the invention has been described with respect to certain preferred embodiments, as will be appreciated by those skilled in the art, it is to be understood that the invention is capable of numerous changes, modifications and rearrangements, and such changes, modifications and rearrangements are intended to be covered by the following claims.

What is claimed is:

1. An automotive vehicle wheel bearing assembly comprising a wheel mounting component defining an axis;
a non-rotating component fixed with respect to a vehicle suspension structure; and
bearing elements rotatably coupling the wheel mounting component to the non-rotating component to allow the wheel mounting component to rotate relative to the non-rotating component about the axis;
wherein the bearing elements include a first outer raceway and a first inner raceway, the first outer raceway and the first inner raceway rollably retaining a plurality of first rolling elements,
wherein an inboard face of the wheel mounting component is spaced axially from an outboard face of a non-rotating component fixed with respect to the vehicle suspension structure in an outboard direction by an axial clearance, so that a side impact displacing the inboard face of the wheel mounting component in the inboard direction by a distance equal to the axial clearance does not cause an impact indentation from the first rolling elements in the first outer raceway or the first inner raceway deeper than about 3 microns, to avoid a noise or vibration condition when the wheel mounting component rotates relative to the non-rotating component during continued operation of the wheel bearing assembly,
wherein a radial-impact supporting contact surface of the wheel mounting component is spaced from a non-rotating radial-impact supporting contact surface fixed with respect to the vehicle suspension structure by a radial clearance, so that a radial impact displacing the radial-impact supporting contact surface of the wheel mounting component in a radial direction toward the non-rotating radial-impact supporting contact surface by a distance equal to the radial clearance does not cause an impact indentation from the first rolling elements in the first outer raceway or the first inner raceway deeper than about 3 microns, to avoid a noise or vibration condition when the wheel mounting component rotates relative to the non-rotating component during continued operation of the wheel bearing assembly, wherein displacement of the inboard face of the wheel mounting component in the inboard direction by a distance greater than the axial clearance is inhibited by the inboard face of the wheel mounting component contacting and transmitting a load to the vehicle suspension structure through the outboard face of a non-rotating component, to inhibit deepening of any impact indentation from the first rolling elements in the first outer raceway or the first inner raceway, and wherein displacement of the radial-impact supporting contact surface of the wheel mounting component in said radial direction by a distance greater than the radial clearance is inhibited by the radial-impact supporting contact surface of the wheel mounting component contacting and transmitting a load to the vehicle suspension structure through the non-rotating radial-impact supporting contact surface, to inhibit deepening of any impact indentation from the first rolling elements in the first outer raceway or the first inner raceway.

2. The vehicle wheel bearing assembly of claim 1, said axial clearance being no more than about 0.30 mm.

3. The vehicle wheel bearing assembly of claim 1, said axial clearance being at least about 0.040 mm.

4. The vehicle wheel bearing assembly of claim 1, said radial clearance being at least about 0.040 mm.

5. The vehicle wheel bearing assembly of claim 1, said radial clearance being no more than about 0.15 mm.

6. The vehicle wheel bearing assembly of claim 1, the inboard face of the wheel mounting component being configured to contact the outboard face of the non-rotating component at a contact area having a radial width of from about 2 millimeters to about 5 millimeters.

7. The vehicle wheel bearing assembly of claim 1, the radial-impact supporting contact surface of the wheel mounting component being configured to contact the non-rotating radial-impact supporting contact surface at a contact area having an axial width of from about 2 millimeters to about 5 millimeters.

8. The vehicle wheel bearing assembly of claim 1, wherein the inboard face of the wheel mounting component is an annular surface inclined with respect to the wheel mounting component axis, and the outboard face of the non-rotating component is inclined with respect to the wheel mounting component axis, both surfaces being symmetric about the axis of the wheel mounting component and inclined with respect to the axis at approximately the same oblique angle.

9. The vehicle wheel bearing assembly of claim 1, further comprising a curved surface connecting the outboard face of the non-rotating component and the non-rotating radial-impact supporting contact surface, at least a portion of said curved surface facing in a direction having a radial component and an axial component.

10. The vehicle wheel bearing assembly of claim 1, wherein said non-rotating radial-impact supporting contact surface comprises a surface of the non-rotating component.

11. The vehicle wheel bearing assembly of claim 1, wherein the first outer raceway and the first inner raceway are outboard raceways, the first rolling elements are outboard rolling elements, and the vehicle wheel bearing assembly further comprises an inboard outer raceway and an inboard inner raceway displaced from the outboard raceway in the inboard direction, the inboard raceways rollably retaining a plurality of inboard rolling elements;

wherein the axial and radial clearances of the wheel mounting component from the respective outboard face of the non-rotating component and non-rotating radial-impact supporting contact surface are sized so that a side or radial impact displacing the wheel mounting component in the inboard or a radial direction by a distance equal to the respective clearance does not cause an impact indentation from the inboard rolling elements in the inboard outer raceway or the inboard inner raceway deep enough to result in a noise or vibration condition when the wheel mounting component rotates relative to the non-rotating component during continued operation of the wheel bearing assembly.

12. The vehicle wheel bearing assembly of claim 1, wherein the first outer raceway is fixed with respect to the non-rotating component and the first inner raceway is fixed with respect to the wheel mounting component.

13. The vehicle wheel bearing assembly of claim 1, wherein the first outer raceway is fixed with respect to the wheel mounting component and the first inner raceway is fixed with respect to the non-rotating component.

14. The vehicle wheel bearing assembly of claim 1, wherein the first rolling elements are balls.

15. The vehicle wheel bearing assembly of claim 14, wherein the first outer raceway and the first inner raceway each have a shoulder height of from about 30% to about 40% of the diameter of the balls.

16. The wheel bearing assembly of claim 1, wherein the wheel mounting component comprises a flange having a thickness of about 8-12 mm.

17. An automotive vehicle wheel bearing assembly comprising a wheel mounting component defining an axis;

a non-rotating component fixed with respect to a vehicle suspension structure; and bearing elements rotatably coupling the wheel mounting component to the non-rotating component to allow the wheel mounting component to rotate relative to the non-rotating component about the axis;

wherein the bearing elements include a first outer raceway and a first inner raceway, the first outer raceway and the first inner raceway rollably retaining a plurality of first rolling elements, wherein an inboard face of the wheel mounting component is spaced axially from an outboard face of a non-rotating component fixed with respect to the vehicle suspension structure in an outboard direction by an axial clearance, so that a side impact having a resultant load offset from the wheel mounting component axis by a radial distance of from about 150 to about 200 millimeters, and displacing the inboard face of the wheel mounting component in the inboard direction by a distance equal to the axial clearance, does not cause an impact indentation from the first rolling elements in the first outer raceway or the first inner raceway deeper than about 3 microns, to avoid a noise or vibration condition when the wheel mounting component rotates relative to the non-rotating component during continued operation of the wheel bearing assembly, wherein displacement of the inboard face of the wheel mounting component in the inboard direction by a distance greater than the axial clearance is inhibited by the inboard face of the wheel mounting component contacting and transmitting a load to the vehicle suspension structure through the non-rotating surface, to inhibit deepening of any impact indentation from the first rolling elements in the first outer raceway or the first inner raceway, and wherein the inboard face of the wheel mounting component is an annular surface inclined with respect to the wheel mounting component axis, and the generally axially facing non-rotating surface is inclined with respect to the wheel mounting component axis, both surfaces being symmetric about the axis of the wheel mounting component and inclined with respect to the axis at approximately the same oblique angle.

18. An automotive vehicle wheel bearing assembly comprising a wheel mounting component defining an axis;

a non-rotating component fixed with respect to a vehicle suspension structure; and bearing elements rotatably coupling the wheel mounting component to the non-rotating component to allow the wheel mounting component to rotate relative to the non-rotating component about the axis;

wherein the bearing elements include a first outer raceway and a first inner raceway, the first outer raceway and the first inner raceway rollably retaining a plurality of first rolling elements, wherein a radial-impact supporting contact surface of the wheel mounting component is spaced from a generally radially-facing non-rotating surface fixed with respect to the vehicle suspension structure by a radial clearance, so that a radial impact displacing the radial-impact supporting contact surface of the wheel mounting component in a radial direction toward the generally radially-facing non-rotating surface by a distance equal to the radial clearance does not cause an impact indentation from the first rolling elements in the first outer raceway or the first inner raceway deeper than about 3 microns, to avoid a noise or vibration condition when the wheel mounting component rotates relative to the non-rotating component during continued operation of the wheel bearing assembly, wherein displacement of the radial-impact supporting contact surface of the wheel mounting component in said radial direction by a distance greater than the radial clearance is inhibited by the inboard face of the wheel mounting component contacting and transmitting a load to the vehicle suspension structure through the non-rotating surface, to inhibit deepening of any impact indentation from the first rolling elements in the first outer raceway or the first inner raceway.

19. The vehicle wheel bearing assembly of claim 18, wherein said radial clearance is no more than about 0.15 millimeter.

20. The vehicle wheel bearing assembly of claim 19, wherein said radial clearance is at least about 0.040 millimeter.

21. The vehicle wheel bearing assembly of claim 18, the radial-impact supporting contact surface of the wheel mounting component being configured to contact the generally radially-facing non-rotating surface at a contact area having an axial width of from about 2 millimeters to about 5 millimeters.

* * * * *